(12) United States Patent
Kakita et al.

(10) Patent No.: US 8,817,104 B2
(45) Date of Patent: Aug. 26, 2014

(54) DATA PROCESSING DEVICE AND DATA PROCESSING METHOD

(75) Inventors: Shinjiro Kakita, Kanagawa (JP); Keita Shirane, Kanagawa (JP)

(73) Assignee: Sony Corporation, Tokyo (JP)

( * ) Notice: Subject to any disclaimer, the term of this patent is extended or adjusted under 35 U.S.C. 154(b) by 1186 days.

(21) Appl. No.: 12/177,364

(22) Filed: Jul. 22, 2008

(65) Prior Publication Data

US 2009/0051771 A1 Feb. 26, 2009

(30) Foreign Application Priority Data

Aug. 20, 2007 (JP) ................................. 2007-213221

(51) Int. Cl.
*H04N 7/18* (2006.01)

(52) U.S. Cl.
USPC ............................. 348/161; 386/241; 382/103

(58) Field of Classification Search
CPC .............................. H04N 5/147; H04N 21/845
USPC ............ 382/103, 190, 100; 386/241, 230, 52; 705/67; 707/999.102, 3; 715/501.5, 715/202; 348/700, 14.15; 725/52
See application file for complete search history.

(56) References Cited

U.S. PATENT DOCUMENTS

| | | | | |
|---|---|---|---|---|
| 6,025,886 | A * | 2/2000 | Koda ............................. | 348/700 |
| 6,055,025 | A * | 4/2000 | Shahraray ..................... | 348/700 |
| 6,370,316 | B1 * | 4/2002 | Yamada et al. ............... | 386/230 |
| 6,400,890 | B1 * | 6/2002 | Nagasaka et al. ............ | 386/241 |
| 6,633,651 | B1 * | 10/2003 | Hirzalla et al. ............... | 382/100 |
| 6,675,174 | B1 * | 1/2004 | Bolle et al. ............. | 707/999.102 |
| 7,227,973 | B2 * | 6/2007 | Ishiyama ....................... | 382/103 |
| 7,500,176 | B2 * | 3/2009 | Thomson et al. ............. | 715/202 |
| 7,565,327 | B2 * | 7/2009 | Schmelzer ....................... | 705/67 |
| 7,821,528 | B2 * | 10/2010 | Lee .............................. | 348/14.15 |
| 7,826,709 | B2 * | 11/2010 | Moriya et al. ................ | 715/202 |
| 2001/0031131 | A1 * | 10/2001 | Fukai et al. ...................... | 386/52 |
| 2006/0048191 | A1 * | 3/2006 | Xiong ............................ | 725/52 |
| 2006/0104514 | A1 * | 5/2006 | Kasutani et al. ............. | 382/190 |
| 2006/0171599 | A1 | 8/2006 | Fukuhara et al. | |
| 2006/0222249 | A1 | 10/2006 | Hosaka et al. | |
| 2007/0061696 | A1 * | 3/2007 | Vallone et al. ............. | 715/501.1 |
| 2008/0313152 | A1 * | 12/2008 | Yoon et al. ........................ | 707/3 |

FOREIGN PATENT DOCUMENTS

| | | |
|---|---|---|
| JP | 5-174072 | 7/1993 |
| JP | 7-46517 | 2/1995 |
| JP | 2003-319421 | 11/2003 |
| JP | 2003-323452 | 11/2003 |

(Continued)

*Primary Examiner* — Dustin Nguyen
(74) *Attorney, Agent, or Firm* — Oblon, Spivak, McClelland, Maier & Neustadt, L.L.P.

(57) ABSTRACT

In the present invention, there is provided a data processing device, including: a first memory configured to store identification information for identification of video data in association with a feature included in the video data; a second memory configured to store the feature included in the video data in association with the identification information for identification of the video data; a first reader configured to read out the identification information stored in the first memory based on a feature included in input video data; a second reader configured to read out the feature stored in the second memory based on the identification information read out by the first reader; and a checker configured to compare the feature included in the input video data with the feature read out by the second reader to determine whether or not the input video data matches video data whose feature is stored in the second memory.

14 Claims, 26 Drawing Sheets

(56) References Cited

FOREIGN PATENT DOCUMENTS

| JP | 2004-234613 | 8/2004 |
| JP | 2006-202145 | 8/2006 |
| JP | 2006-285615 | 10/2006 |
| WO | WO 2007066924 A1 * | 6/2007 |

* cited by examiner

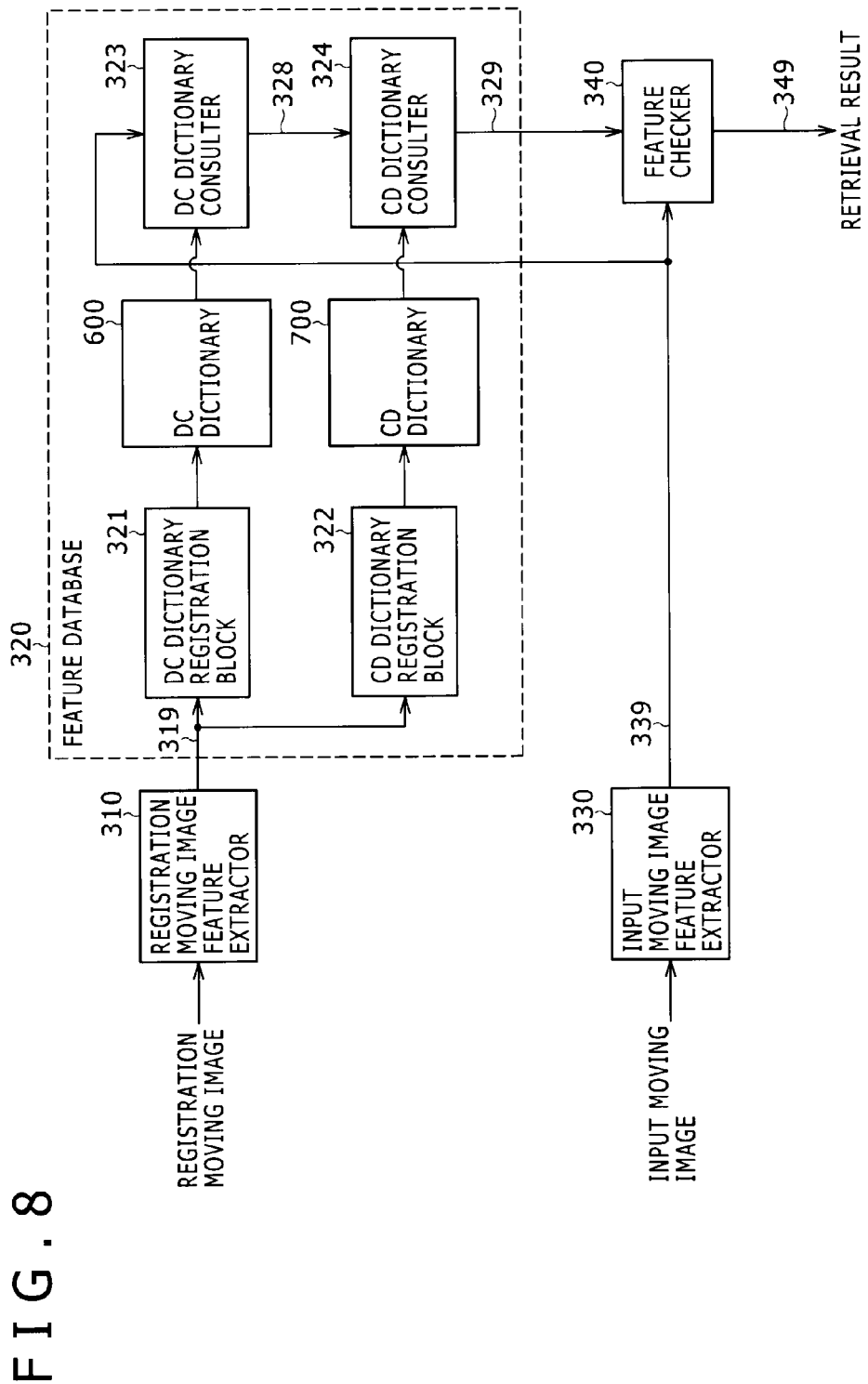

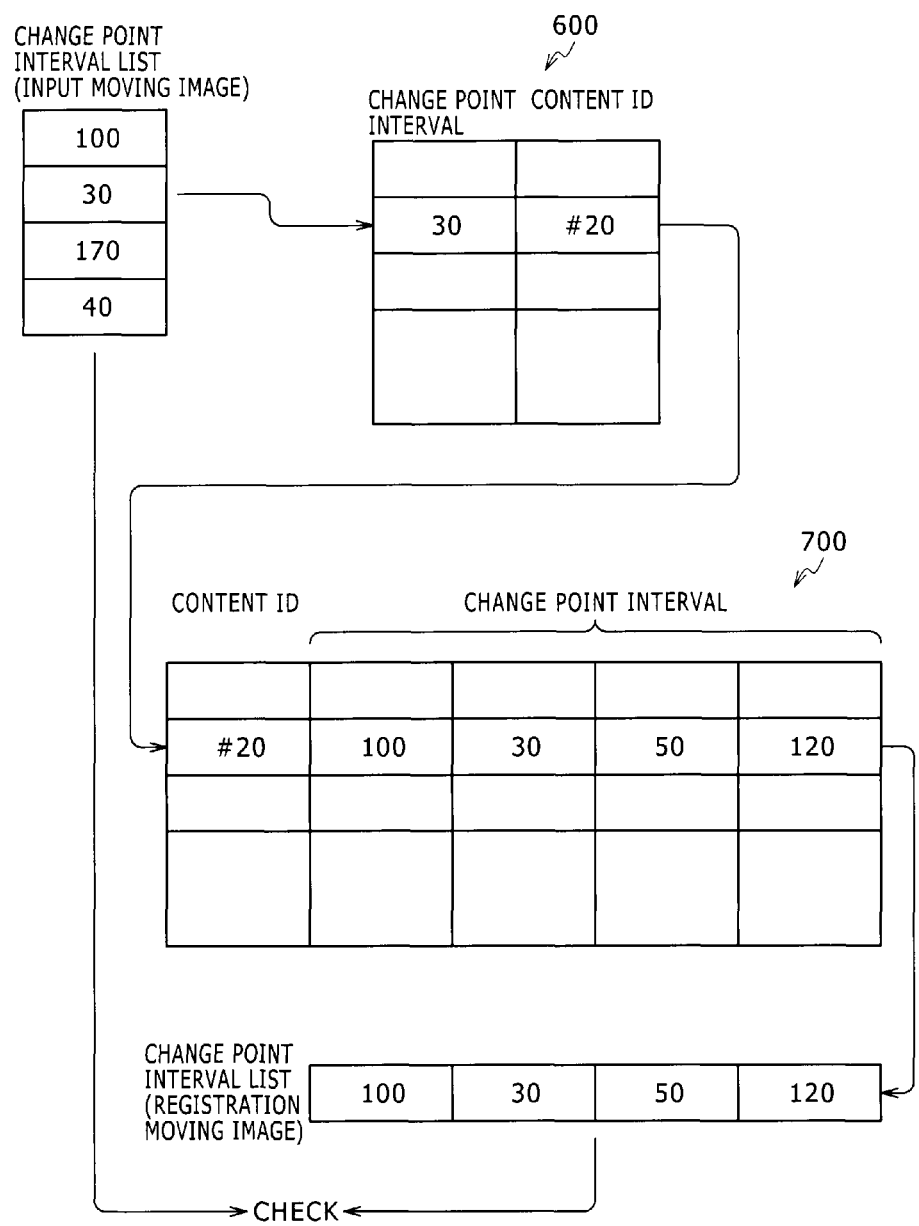

FIG.18A

| INDEX | 0 | 1 | 2 | 3 | 4 |
|---|---|---|---|---|---|
| CHANGE POINT INTERVAL | 5 | 3 | 3 | 1 | 4 |
| CONTENT ID | #21 | #6 | #62 | #15 | #38 |

FIG.18B

| CHANGE POINT INTERVAL | 0 | 1 | 2 | 3 | 4 | 5 |
|---|---|---|---|---|---|---|
| THE NUMBER OF TIMES OF APPEARANCE(X) | 0 | 1 | 0 | 2 | 1 | 1 |

FIG.18C

| CHANGE POINT INTERVAL | 0 | 1 | 2 | 3 | 4 | 5 |
|---|---|---|---|---|---|---|
| CUMULATIVE FREQUENCY(Y) | 0 | 1 | 1 | 3 | 4 | 5 |

FIG.18D

| CHANGE POINT INTERVAL | 0 | 1 | 2 | 3 | 4 | 5 |
|---|---|---|---|---|---|---|
| Y-X |  |  | 0 | 1 | 3 | 4 |
| Y-1 |  | 0 |  | 2 | 3 | 4 |

| INDEX | 0 | 1 | 2 | 3 | 4 |
|---|---|---|---|---|---|
| CHANGE POINT INTERVAL | 1 | 3 | 3 | 4 | 5 |
| CONTENT ID | #15 | #6 | #62 | #38 | #21 |

DATA PROCESSING DEVICE AND DATA PROCESSING METHOD

CROSS REFERENCES TO RELATED APPLICATIONS

The present invention contains subject matter related to Japanese Patent Application JP 2007-213221 filed in the Japan Patent Office on Aug. 20, 2007, the entire contents of which being incorporated herein by reference.

BACKGROUND OF THE INVENTION

1. Field of the Invention

The present invention relates to data processing devices, and particularly to a data processing device and a data processing method for retrieving content similar to input moving image content from registered moving image content.

2. Description of Related Art

In recent years, network techniques such as the Internet are being improved, so that high-speed communication of various pieces of information is becoming possible and the reliability of this communication is being enhanced. Furthermore, a moving image sharing system is becoming prevalent. In this system, moving images are uploaded to a moving image management server connected to the Internet, and the moving images can be viewed in such a manner as to be shared by plural personal computers connected to the Internet.

For example, the following online service is prevalent. Specifically, in the service, a personal computer in a user's home is connected to a moving image management server via the Internet, and a moving image is uploaded to the moving image management server from the personal computer in the user's home so that this moving image can be viewed from another personal computer.

In such a moving image sharing system, the uploaded moving image will be one created by the user itself in some cases, but will be one that violates other people's copyrights in other cases. If a moving image that violates other people's copyrights is thus uploaded, it is important to prevent people from viewing the moving image e.g. by banning the downloading of the moving image. For determinations as to whether or not the uploaded moving images violate other people's copyrights, usually the manager of the moving image management server directly views the respective uploaded moving images to thereby make the determinations. However, it is difficult for the manager to view all the moving images if the number of uploaded moving images is large.

To address this problem, e.g. an image retrieval device has been proposed. This device makes determinations as to the matching and similarity of images with respect to a specific image, to thereby retrieve the image that matches the specific image without completely decoding video content compression-coded in accordance with e.g. the JPEG2000 system (refer to e.g. Japanese Patent Laid-Open No. 2006-285615 (FIG. 1)).

SUMMARY OF THE INVENTION

In this related-art technique, by making comparison of the number of zero-bit planes of the code block at the same position between a code stream and a specific image, the matching determination is carried out without completely coding the code stream.

However, moving image content is composed of a large number of frames arranged in a time-series manner. Therefore, feature extraction from moving image content on a frame-by-frame basis leads to a problem that the amount of the extracted feature is significantly large and thus the area for storing the extracted feature and the arithmetic amount required for the comparison processing are large.

There is a need for the present invention to reduce the amount of the feature that is to be extracted from moving image content to thereby allow efficient retrieval of moving image content.

According to an embodiment of the present invention, there is provided a data processing device, including: a first memory configured to store identification information for identification of video data in association with a feature included in the video data; a second memory configured to store the feature included in the video data in association with the identification information for identification of the video data; a first reader configured to read out the identification information stored in the first memory based on a feature included in input video data; a second reader configured to read out the feature stored in the second memory based on the identification information read out by the first reader; and a checker configured to compare the feature included in the input video data with the feature read out by the second reader to determine whether or not the input video data matches video data whose feature is stored in the second memory.

The embodiment of the present invention can provide an excellent advantage of reducing the amount of the feature that is to be extracted from moving image content to thereby allow efficient retrieval of moving image content.

BRIEF DESCRIPTION OF THE DRAWINGS

These and other objects of the invention will be seen by reference to description, taken in connection with the accompanying drawings, in which:

FIG. 8 is a diagram showing a configuration example of a feature database and the periphery thereof according to the embodiment of the present invention;

FIG. 10 is a diagram conceptually showing the relationship between a DC dictionary and a CD dictionary according to the embodiment of the present invention;

FIGS. 18A to 18D are diagrams showing one example of a sort by a sorter according to the embodiment of the present invention;

DETAILED DESCRIPTION OF THE PREFERRED EMBODIMENT

An embodiment of the present invention will be described in detail below with reference to the accompanying drawings.

Figure 1:
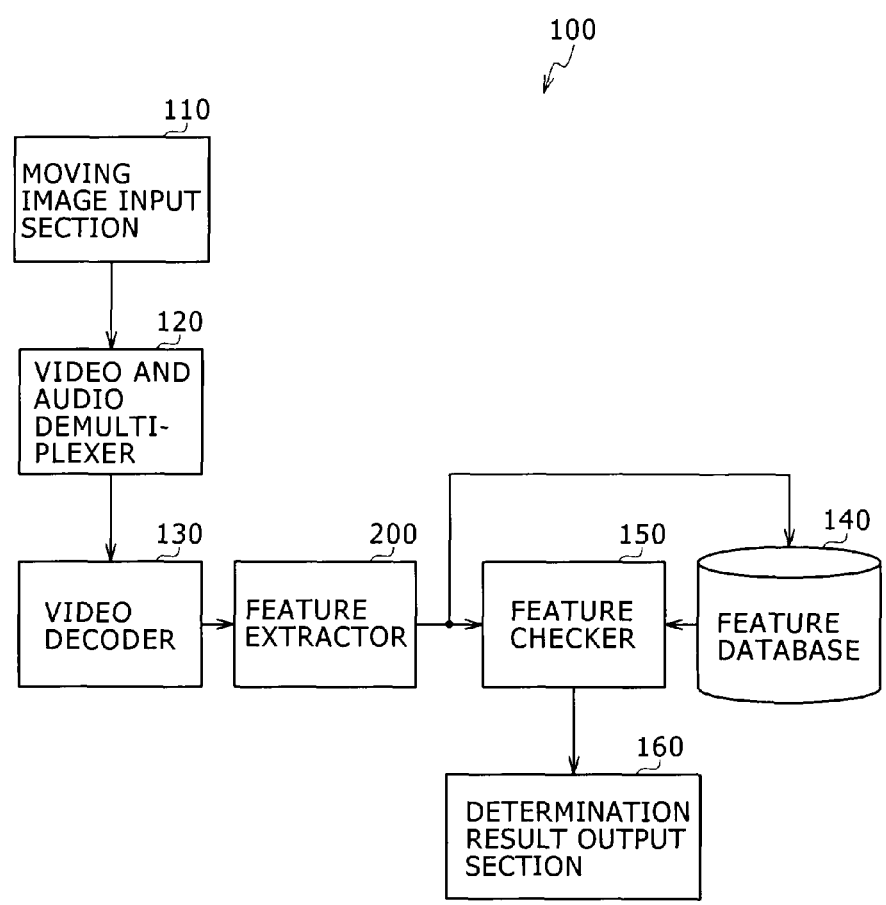
FIG. 1 is a block diagram showing one configuration example of a content retrieval device according to an embodiment of the present invention.

FIG. 1 is a block diagram showing one configuration example of a content retrieval device 100 according to the embodiment of the present invention. This content retrieval device 100 includes a moving image input section 110, a video and audio demultiplexer 120, a video decoder 130, a feature extractor 200, a feature database 140, a feature checker 150, and a determination result output section 160. This content retrieval device 100 can be realized by e.g. a personal computer that can extract a feature of a moving image (moving image content) captured by an imaging device such as a digital video camera through video analysis and can execute various kinds of image processing by using the extracted feature.

The moving image input section 110 is a unit to which a moving image is input, and outputs the input moving image to the video and audio demultiplexer 120. Examples of the moving image that is to be input to the moving image input section 110 include a moving image captured by an imaging device 110 and a moving image received by television broadcasting.

The video and audio demultiplexer 120 separates the moving image output from the moving image input section 110 into video data (signal) and audio data (signal), and outputs the separated video data to the video decoder 130. The separated audio data is not particularly utilized in the embodiment of the present invention.

The video decoder 130 creates baseband data by decoding the video data output from the video and audio demultiplexer 120, and outputs the created baseband data to the feature extractor 200.

The feature extractor 200 extracts a feature based on the baseband data output from the video decoder 130, and outputs the extracted feature to the feature database 140 and the feature checker 150. In the embodiment of the present invention, as the feature extracted by the feature extractor 200, the interval of change points (hereinafter, referred to as a change point interval) in a moving image is employed as an example. The change point encompasses e.g. a cut-change point that indicates the boundary of an instantaneous scene change of a moving image, and a crossfade point that indicates the boundary of a comparatively-large scene change of a moving image. The change point interval indicates the time, the number of frames, or the like of the leg between consecutive change points. The change point intervals extracted by the feature extractor 200 are arranged in a time-series manner, which forms a change point interval list.

The feature database 140 stores the change point interval list output from the feature extractor 200 for each moving image content. This feature database 140 outputs the stored change point interval list to the feature checker 150 at the time of feature check.

The feature checker 150 checks the change point interval list output from the feature extractor 200 against the respective change point interval lists stored in the feature database 140. Based on the check result, the feature checker 150 determines whether or not the moving image input to the moving image input section 110 matches the moving image corresponding to the change point interval list stored in the feature database 140. The check determination result by the feature checker 150 is output to the determination result output section 160 as a matching list. That is, the feature checker 150 retrieves the change point interval list corresponding to the moving image that matches the moving image input to the moving image input section 110, from the change point interval lists stored in the feature database 140.

The determination result output section 160 outputs the matching list output from the feature checker 150. For example, the determination result output section 160 can display the matching list output from the feature checker 150.

As above, the content retrieval device 100 according to the embodiment of the present invention determines whether or not matching of moving image content is found by checking change point intervals of the moving image content.

Figure 2:
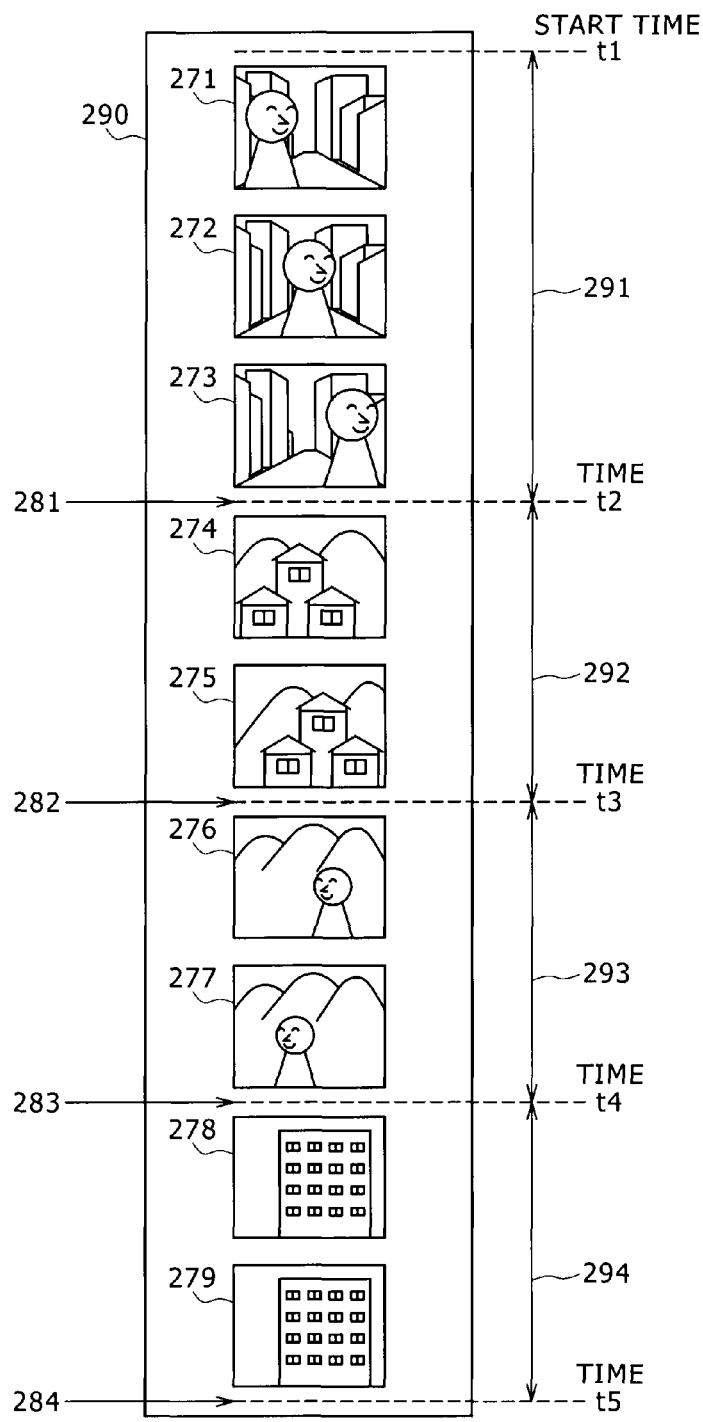
FIG. 2 is a diagram showing the relationship between moving image content and change points according to the embodiment of the present invention.

FIG. 2 is a diagram showing the relationship between moving image content and change points in the embodiment of the present invention. In the following description, a cut-change point is employed as one example of the change point. FIG. 2 schematically shows images 271 to 279 corresponding to the respective frames included in a moving image 290 captured by an imaging device. The images 271 to 279 are included in one moving image 290. Four scenes whose imaging times and places are different from each other are included in the moving image 290, and therefore the composition, color, and so on of the subject instantaneously change across the frames corresponding to the scene changes. Such a change between consecutive two frames is detected so as to be determined as a cut-change point.

For example, the images 271 to 273 arise from imaging of a person walking around town. These images look similar to each other as a whole although the person moves across the images and thus the position of the person is somewhat different among the images. Therefore, no change occurs between consecutive two frames of the images 271 to 273, and thus it is determined that the boundaries between consecutive two frames are each not a cut-change point.

The images 274 and 275 arise from imaging of a row of houses in front of mountains. These images look similar to each other as a whole although they are captured in such a way that the imaging device is horizontally moved and thus the subject position horizontally moves so as to be somewhat different from each other between the images. However, the images 273 and 274 are different from each other as a whole because the boundary between these images corresponds to a switch of scenes whose imaging times and places are different from each other. Consequently, the boundary between the images 273 and 274 is detected as a cut-change point 281.

Similarly, the boundary between the images 275 and 276 and the boundary between the images 277 and 278 are also detected as cut-change points 282 and 283, respectively.

The leg delimited by the thus detected cut-change points will be referred to as a leg between cut-change points, and the length of the leg between cut-change points will be referred to as a cut-change point interval. Although the above-described example relates to the cut-change point as one example of the change point, the same applies also to other kinds of change points. Therefore, the leg delimited by change points will be referred to as a leg between change points, and the length of the leg between change points will be referred to as a change point interval.

This change point can be detected in the following manner based on the grayscales of the images corresponding to the respective frames included in moving image content.

Figure 3A:
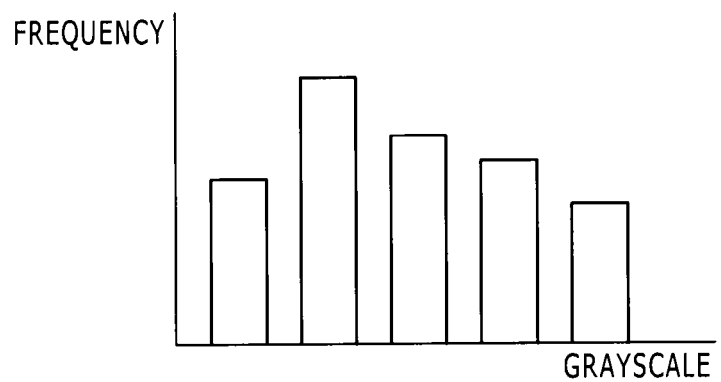
FIGS. 3A to 3C are diagrams for explaining the outline of change point determination according to the embodiment of the present invention.
Figure 3B:
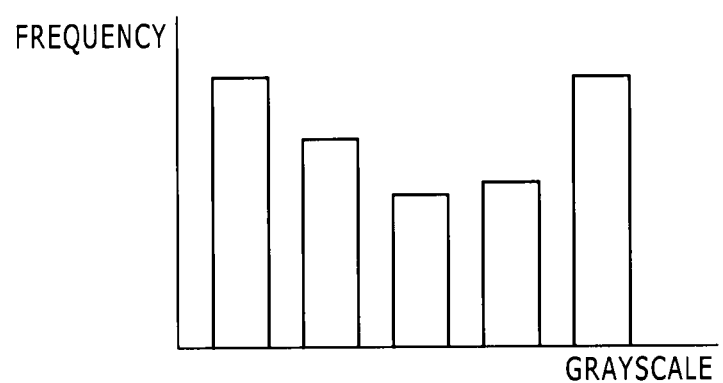
Figure 3C:
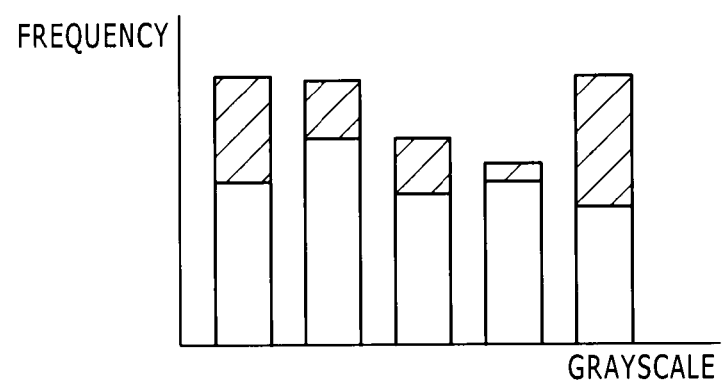

FIG. 3 is a diagram for explaining the outline of the change point determination in the embodiment of the present invention. FIGS. 3A to 3C each show a histogram based on each or all of a luminance signal Y, a color difference signal (blue) Cb, and a color difference signal (red) Cr of each of the pixels in the entire screen. In FIGS. 3A to 3C, the abscissa indicates the grayscale, and the ordinate indicates the frequency. For example, FIG. 3A shows the histogram of a moving image a, and FIG. 3B shows the histogram of a moving image b subsequent to the moving image a. FIG. 3C indicates the area differences between the histograms of the moving images a and b.

Specifically, the hatched areas in FIG. 3C are equivalent to the area differences between the histograms shown in FIGS. 3A and 3B. If the sum of these differences surpasses a predetermined threshold, it can be determined that the boundary between the moving images a and b is a cut-change point.

Figure 4:
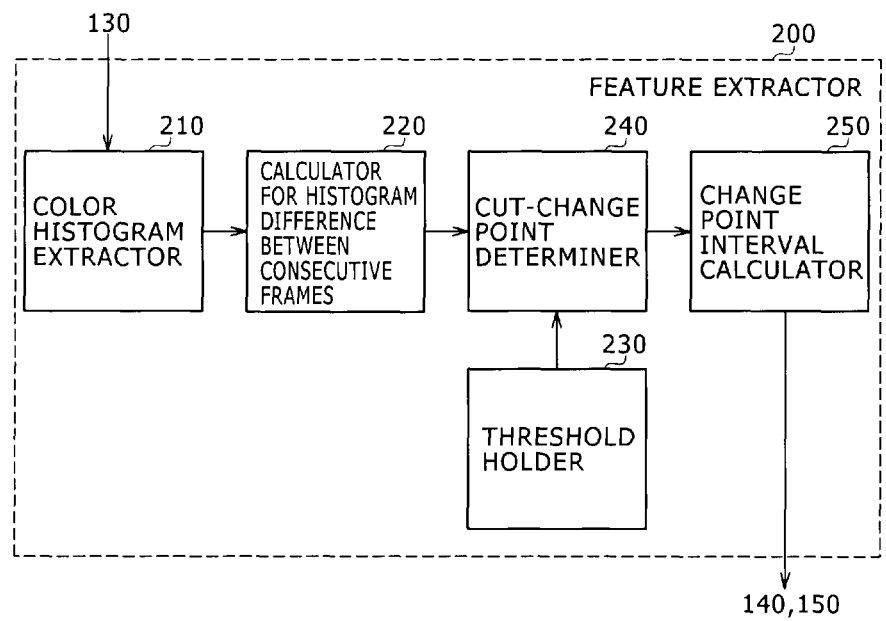
FIG. 4 is a block diagram showing a functional configuration example of a feature extractor according to the embodiment of the present invention.

FIG. 4 is a block diagram showing a functional configuration example of the feature extractor 200 according to the embodiment of the present invention. This feature extractor 200 includes a color histogram extractor 210, a calculator 220 for the histogram difference between consecutive frames, a threshold holder 230, a cut-change point determiner 240, and a change point interval calculator 250.

The color histogram extractor 210 holds baseband data output from the video decoder 130 in a buffer and samples the color histogram of the luminance signal Y, the color difference signal (blue) Cb, and the color difference signal (red) Cr of each of the pixels in the entire screen from the baseband data held in the buffer. In addition, for the sampled color histogram, the color histogram extractor 210 separates the grayscales into N stages (e.g. N=16) and carries out normalization in such a way that the sum of the frequencies of the respective stages becomes constant. Examples of this histogram are shown in FIGS. 3A and 3B. The color histogram extractor 210 outputs the normalized histogram of Y, Cb, and Cr to the histogram difference calculator 220.

The histogram difference calculator 220 calculates the differences in the color histogram area between consecutive two frames, for the color histograms of Y, Cb, and Cr of the respective frames output from the color histogram extractor 210. The calculator 220 outputs the calculated histogram differences to the cut-change point determiner 240. For example, as the area difference between the color histograms shown in FIGS. 3A and 3B corresponding to consecutive two frames, the area of the hatched areas shown in FIG. 3C is calculated.

The threshold holder 230 holds a threshold used when the cut-change point determiner 240 determines whether or not the boundary between consecutive two frames is a cut-change point, and outputs the held threshold to the cut-change point determiner 240.

The cut-change point determiner 240 determines whether or not the boundary between consecutive two frames is a cut-change point, based on whether or not the histogram difference output from the histogram difference calculator 220 surpasses the threshold held in the threshold holder 230. Specifically, if the histogram difference output from the calculator 220 surpasses the threshold held in the threshold holder 230, the cut-change point determiner 240 determines that the boundary between consecutive two frames corresponding to the histogram difference is a cut-change point, and outputs the time corresponding to this boundary as a cut-change point time to the change point interval calculator 250. On the other hand, if the histogram difference output from the calculator 220 does not surpass the threshold held in the threshold holder 230, the cut-change point determiner 240 determines that the boundary between consecutive two frames corresponding to the histogram difference is not a cut-change point. If it is determined that the boundary is not a cut-change point in this way, no time is output to the change point interval calculator 250.

The change point interval calculator 250 calculates the time interval between adjacent two cut-change points based on the times of the cut-change points output from the cut-change point determiner 240. The change point interval calculator 250 outputs the calculated cut-change point intervals to the feature database 140 and the feature checker 150. Specifically, if a cut-change point time is output from the cut-change point determiner 240, the change point interval calculator 250 calculates the difference between this time and the time output immediately before this time to thereby calculate the time interval between adjacent two cut-change points. As the interval between adjacent two cut-change points, the number of frames included in the leg between these cut-change points may be calculated and the calculated number of frames may be employed as the interval of the cut-change points.

Figure 5:
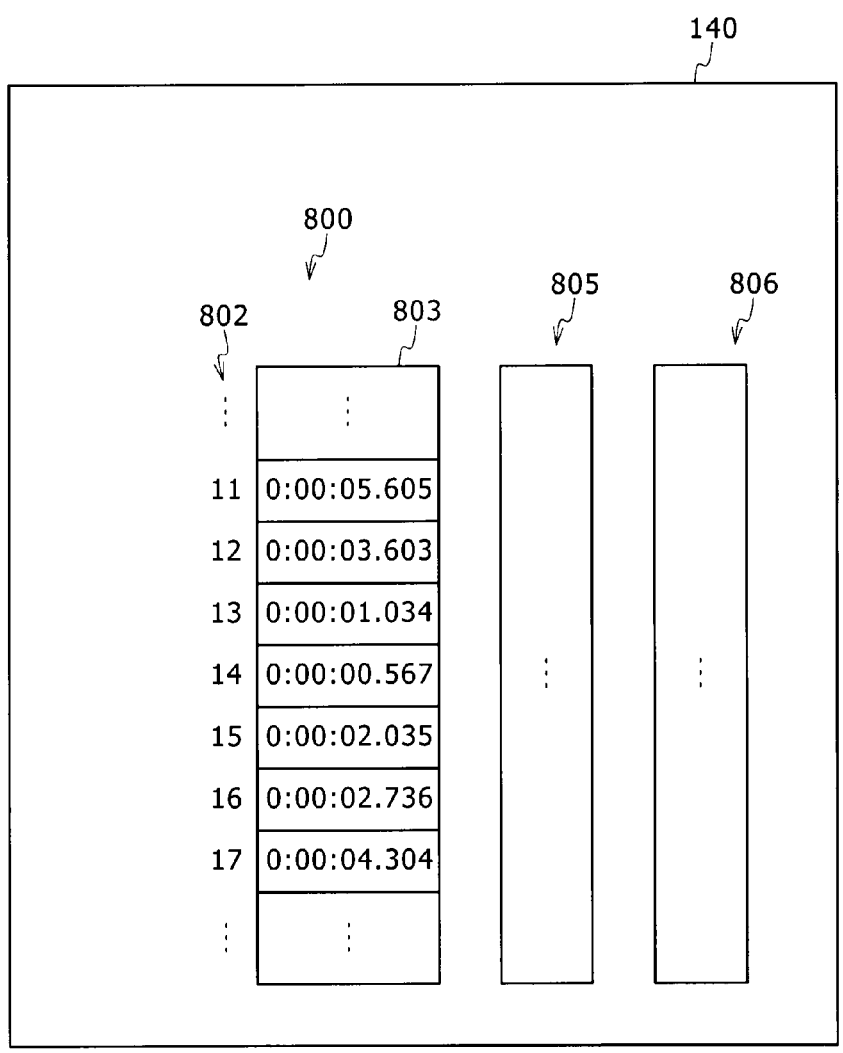
FIG. 5 is a diagram schematically showing a cut-change point interval list according to the embodiment of the present invention.

FIG. 5 is a diagram schematically showing a cut-change point interval list according to the embodiment of the present invention. One or plural cut-change point interval lists are stored in the feature database 140. For example, cut-change point interval lists 800, 805, and 806 are stored in the feature database 140. The cut-change point interval lists stored in the feature database 140 may be created by sequentially storing cut-change point intervals output from the feature extractor 200, or alternatively may be created by sequentially storing cut-change point intervals extracted by another information processing device.

In the cut-change point interval list 800, cut-change point intervals 803 are recorded in a time-series manner. These intervals are associated with content ID for identification of the corresponding moving image. The content ID can be used for retrieval of a moving image stored in a moving image database provided inside or outside the content retrieval device 100. For example, "#123" is given as the content ID corresponding to the cut-change point interval list 800. Furthermore, in FIG. 5, node IDs 802 are given as identification numbers of the cut-change point intervals extracted from the corresponding moving image.

The cut-change point intervals 803 indicate the cut-change point intervals extracted from the corresponding moving image as times, and are recorded in a time-series manner.

In matching retrieval for a moving image input to the moving image input section 110 by use of the feature database 140 in which one or plural cut-change point interval lists are thus stored, the cut-change point interval lists stored in the feature database 140 are sequentially read out one by one, and the following retrieval processing is executed.

Figure 6:
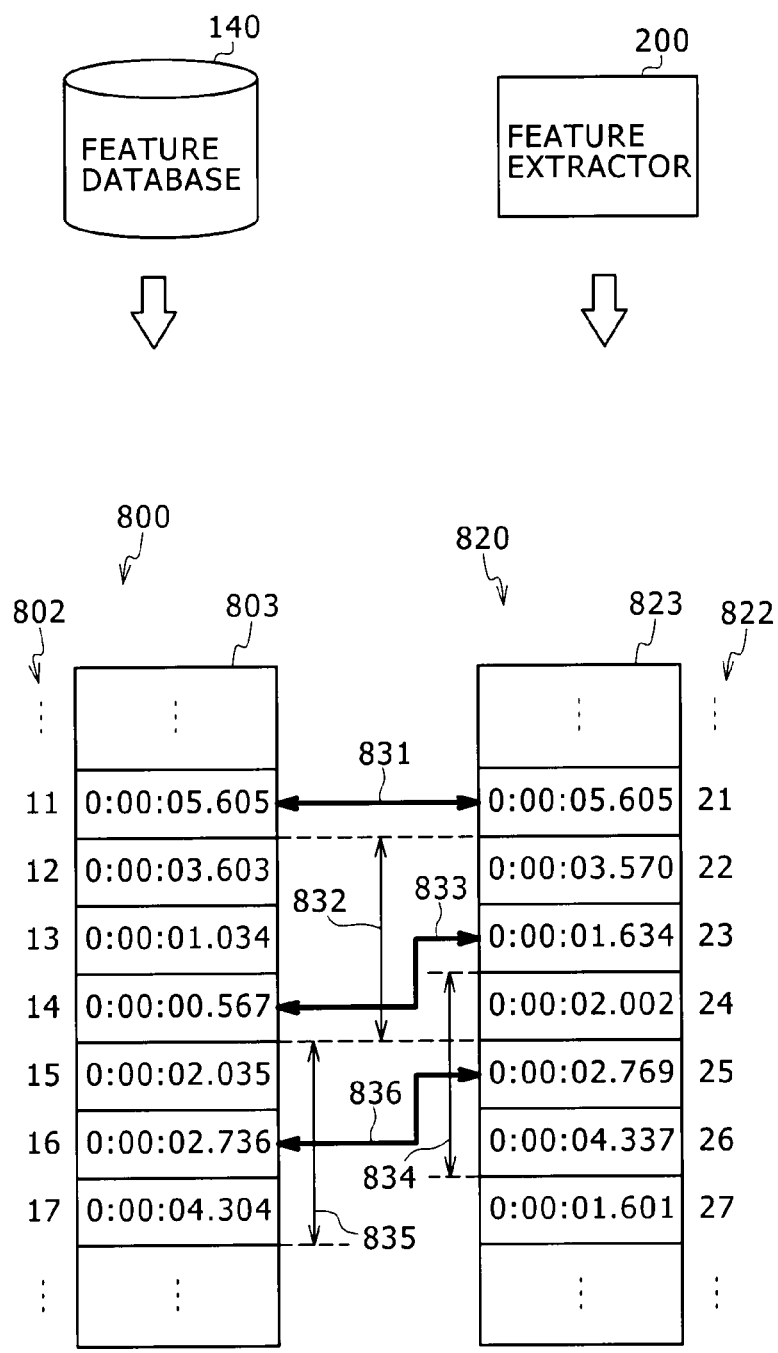
FIG. 6 is a diagram showing a specific example of check by a feature checker according to the embodiment of the present invention.
Figure 7:
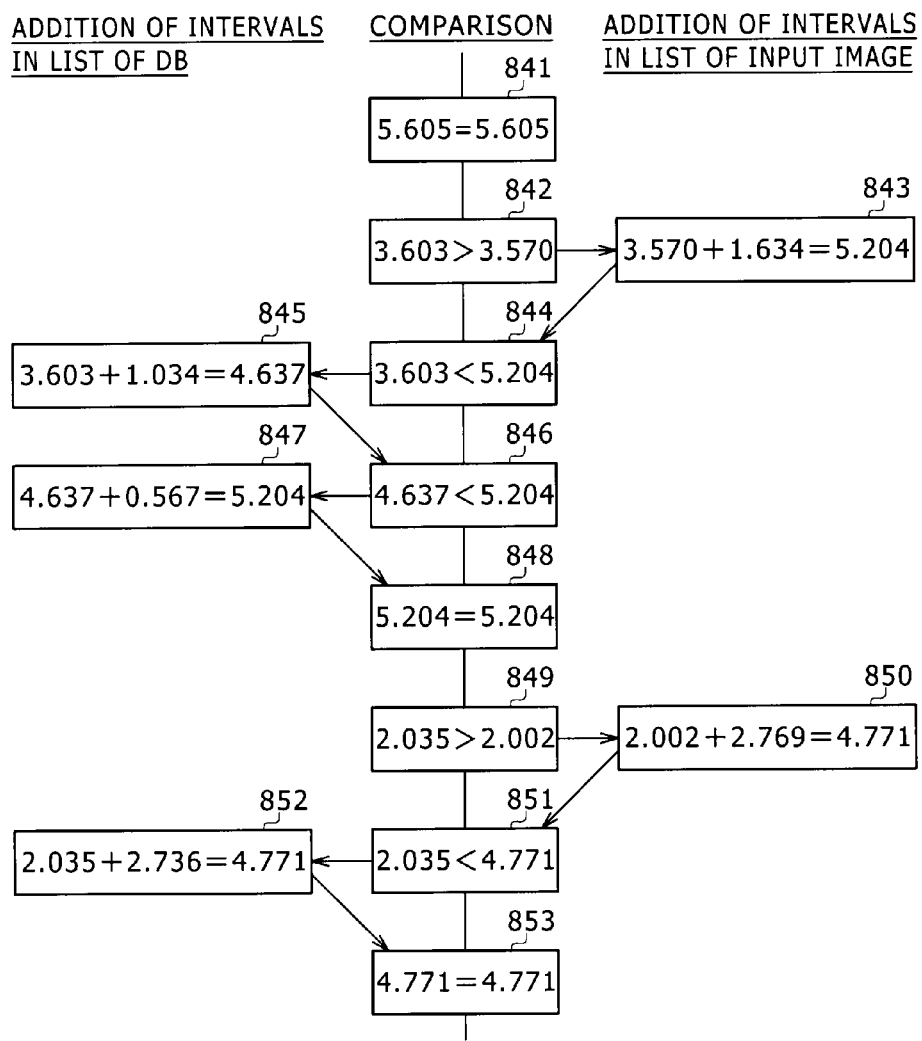
FIG. 7 is a diagram showing a form of check of cut-change point interval lists according to the embodiment of the present invention.

FIG. 6 is a diagram showing a specific example of the check by the feature checker 150 in the embodiment of the present invention. Specifically, FIG. 6 shows one example of the cut-change point interval list 800 read out from the feature database 140 and a cut-change point interval list 820 corresponding to cut-change point intervals extracted from a moving image input through the moving image input section 110 as the retrieval subject. FIG. 7 is a diagram showing the form of the check of the cut-change point interval lists according to the embodiment of the present invention. With reference to FIGS. 6 and 7, a description will be made below about how to make a determination as to whether or not the moving images corresponding to the cut-change point interval lists 800 and 820 match each other through the check of these lists.

Initially, a cut-change point interval list as the comparison subject with respect to the cut-change point interval list 820 is read out from the feature database 140. For example, the cut-change point interval list 800 is read out. Subsequently, the values of the cut-change point intervals 803 in the cut-change point interval list 800 and the values of cut-change point intervals 823 in the cut-change point interval list 820 are sequentially compared with each other based on the order of the node IDs, so that the values matching each other are detected. For example, as indicated by an arrow 831, the value "0:00:05.605" of the cut-change point interval 803 corresponding to "11" of the node ID 802 in the cut-change point interval list 800 matches the value "0:00:05.605" of the cut-change point interval 823 corresponding to "21" of a node ID 822 in the cut-change point interval list 820 (841). In FIG. 7, the indication of former parts of the respective values of the cut-change point intervals shown in FIG. 6 is omitted.

If the values of the cut-change point intervals matching each other are thus detected from two cut-change point interval lists, the value of the cut-change point interval corresponding to the node ID subsequent to that of this matching value is read out from each of two lists. For example, the value "0:00:03.603" of the cut-change point interval 803 corresponding to "12" of the node ID 802 in the cut-change point interval list 800 and the value "0:00:03.570" of the cut-change point interval 823 corresponding to "22" of the node ID 822 in the cut-change point interval list 820 are read out. Subsequently, whether or not these read-out two values match each other is determined (842). If these values match each other, the value of the cut-change point interval corresponding to the node ID subsequent to that of this matching value is read out from each of two lists, and whether or not these read-out values match each other is determined.

On the other hand, as shown in FIGS. 6 and 7, if read-out two values do not match each other (842), from the cut-change point interval list from which the smaller value of these two values as the comparison subjects has been read out, the value of the cut-change point interval corresponding to the node ID subsequent to that of this smaller value is read out so as to be added to the comparison-subject smaller value. For example, the value "0:00:03.603" of the cut-change point interval 803 is compared with the value "0:00:03.570" of the cut-change point interval 823. The value "0:00:03.570" of the cut-change point interval 823 is smaller. Thus, the value "0:00:01.634" of the cut-change point interval 823 corresponding to "23" of the node ID 822 in the cut-change point interval list 820 is read out so as to be added to the value "0:00:03.570" of the cut-change point interval 823 (843).

Subsequently, whether or not the value arising from the addition matches the value to which addition is not applied is determined (844). If these values match each other, the value of the cut-change point interval corresponding to the node ID subsequent to that of this matching value is read out from each of two lists, and whether or not these read-out values match each other is determined. In this way, the values in a predetermined range from the first matching value are sequentially added, and whether or not values of two cut-change point interval lists match each other is determined. As the predetermined range, e.g. the range of three node IDs can be employed. For example, in a three-node-ID range 832 from the first matching values coupled to each other by the arrow 831 shown in FIG. 6, addition processing (843, 845, 847) is executed and comparison processing is executed (842, 844, 846, 848). As a result, in the three-node-ID range 832, two values as the comparison subjects match each other at the position indicated by an arrow 833 (848).

If values of two cut-change point interval lists match each other in the predetermined range from the first matching values in this manner, values in a predetermined range from these matching values are sequentially added similarly, and whether or not values of two cut-change point interval lists match each other is determined. As this predetermined range, e.g. the range corresponding to three node IDs may be employed similarly to the first range, or alternatively a different value may be employed.

For example, in a range 835 corresponding to three node IDs in the cut-change point interval list 800 and in a range 834 corresponding to three node IDs in the cut-change point interval list 820 from the matching values coupled to each other by the arrow 833 shown in FIG. 6, addition processing (850, 852) is executed and comparison processing is executed (849, 851, 853). As a result, in the three-node-ID ranges 834 and 835, two values as the comparison subjects match each other at the position indicated by an arrow 836 (853).

If at least one of two values read out on the basis of the first matching values or second or subsequent matching values matches the other comparison-subject value before this at least one value is subjected to addition processing, the next comparison processing is executed on the basis of these matching values without addition processing for this at least one value. If addition-result values do not match each other in the predetermined range, detection of matching values from two lists is repeated again.

As above, the content retrieval device 100 according to the embodiment of the present invention checks change point intervals of moving image content to thereby determine whether or not matching of the moving image content is found. In this check, the change point interval of the adjacent leg between change points is added. This allows appropriate determination even when detection of change points is insufficient. In general, it is difficult to keep high retrieval accuracy in comparison of moving image content of different bit rates. However, the embodiment of the present invention can retrieve moving image content having a different bit rate or image size with high accuracy by utilizing change point intervals as a feature of the moving image content.

Next, the configuration of the feature database according to the embodiment of the present invention will be described below with reference to diagrams.

FIG. 8 is a diagram showing a configuration example of the feature database and the periphery thereof according to the embodiment of the present invention. In FIG. 8, a registration moving image feature extractor 310 and an input moving image feature extractor 330 correspond to the feature extractor 200 of FIG. 1. A feature database 320 corresponds to the feature database 140 of FIG. 1. A feature checker 340 corresponds to the feature checker 150 of FIG. 1.

The registration moving image feature extractor 310 extracts, from moving image content as the target of feature registration in the feature database 320 (hereinafter, such moving image content will be referred to as a registration moving image), change point intervals as a feature of the registration moving image. The input moving image feature extractor 330 extracts, from moving image content input as the retrieval subject (hereinafter, such moving image content will be referred to as an input moving image), change point intervals as a feature of the input moving image. Both the extractors are different from each other in moving image content as the feature extraction subject, but are not different in the basic configuration: they each have the same configuration as that of the feature extractor 200 described with FIG. 4.

The feature database 320 has a DC dictionary 600 and a CD dictionary 700 as its memories. The feature database 320 further includes a DC dictionary registration block 321 for registering a registration moving image in the DC dictionary 600, a CD dictionary registration block 322 for registering a registration moving image in the CD dictionary 700, a DC dictionary consulter 323 for consulting the DC dictionary 600, and a CD dictionary consulter 324 for consulting the CD dictionary 700. The DC dictionary 600 is a dictionary used for reading-out of a content ID by use of a change point interval (duration) as the consultation key (duration to content ID dictionary). The CD dictionary 700 is a dictionary used for reading-out of a change point interval by use of a content ID as the consultation key (content ID to duration dictionary).

When change point intervals of a registration moving image are extracted by the registration moving image feature extractor 310, the change point interval list of the change point intervals and the content ID of the registration moving image are supplied via a signal line 319 to the DC dictionary registration block 321 and the CD dictionary registration block 322. Subsequently, registration from the DC dictionary registration block 321 to the DC dictionary 600 and registration from the CD dictionary registration block 322 to the CD dictionary 700 are carried out.

When change point intervals of an input moving image are extracted by the input moving image feature extractor 330, the change point interval list of the change point intervals and the content ID of the input moving image are supplied via a signal line 339 to the DC dictionary consulter 323 and the feature checker 340. Subsequently, the DC dictionary consulter 323 consults the DC dictionary 600 by using the change point intervals of the input moving image as the consultation key, and supplies the content IDs of read-out registration moving images to the CD dictionary consulter 324 via a signal line 328. The CD dictionary consulter 324 consults the CD dictionary 700 by using the content IDs of the registration moving images supplied from the DC dictionary consulter 323 as the consultation key, and supplies read-out change point interval lists of the registration moving images to the feature checker 340.

The feature checker 340 checks the change point interval list supplied from the input moving image feature extractor 330 against the change point interval lists supplied from the CD dictionary consulter 324, to thereby determine whether or not the input moving image matches the registration moving image. Details of this check have been already described above with FIGS. 6 and 7.

Figure 9A:
FIGS. 9A to 9C are diagrams showing the form of operation with respect to a feature database according to the embodiment of the present invention.

FIG. 9 is a diagram showing the form of operation with respect to the feature database 320 in the embodiment of the present invention. As shown in FIG. 9A, at the time of registration, the change point interval list of a registration moving image is extracted by the registration moving image feature extractor 310 and registered in the feature database 320. Due to this operation, the change point interval lists of registration moving images are stored in the feature database 320 together with the content IDs of the registration moving images.

Figure 9B:
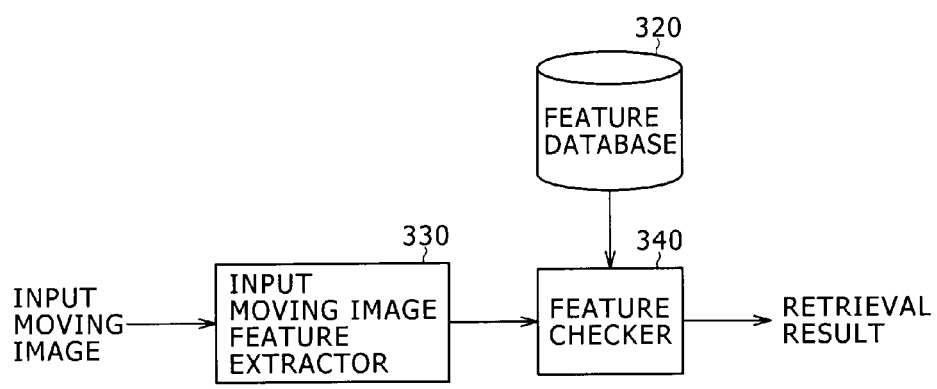

As shown in FIG. 9B, at the time of check, the change point interval list of an input moving image is extracted by the input moving image feature extractor 330 and checked against the change point interval lists of registration moving images, read out from the feature database 320.

Figure 9C:
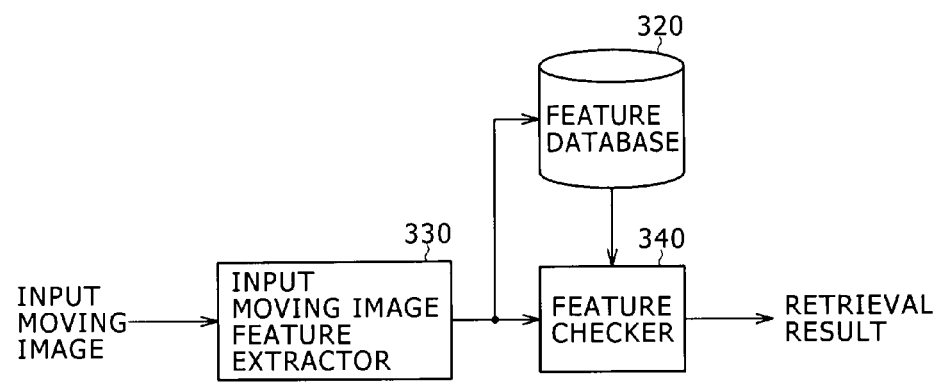

The operation of FIGS. 9A and 9B is based on an assumption that change point interval lists are statically registered in the feature database 320. However, as shown in FIG. 9C, when the change point interval list of an input moving image is extracted at the time of check, this change point interval list may be dynamically registered in the feature database 320. This allows the change point interval lists of input moving images to be sequentially stored together with the content IDs of the input moving images.

FIG. 10 is a diagram conceptually showing the relationship between the DC dictionary 600 and the CD dictionary 700 in the embodiment of the present invention.

The DC dictionary 600 is consulted in such a way that a change point interval included in the change point interval list of an input moving image is used as the consultation key, and outputs the content ID of a registration moving image. In this example, a change point interval "30" included in the change point interval list of an input moving image serves as the key, so that a content ID "#20" is output.

The CD dictionary 700 is consulted in such a way that the content ID output from the DC dictionary 600 is used as the consultation key, and outputs the change point interval list of a registration moving image. In this example, the content ID "#20" output from the DC dictionary 600 serves as the key, so that the change point interval list of the registration moving image corresponding to this content ID is output.

In the CD dictionary 700, for each of registration moving images, the change point interval list is so stored as to be associated with the content ID. Therefore, it would be possible to find the change point interval list of the target registration moving image by consulting all the data stored in the CD dictionary 700. However, in the embodiment of the present invention, the change point intervals that match change point intervals included in the change point interval list of an input moving image should be retrieved from the change point interval lists of the registration moving images. Therefore, it is ineffective to consult all the data stored in the CD dictionary 700. Thus, in the embodiment of the present invention, the DC dictionary 600 outputs, in association with change point intervals as the key, the content IDs of the registration moving images including these change point intervals, to thereby narrow down the change point interval lists that should be read out from the CD dictionary 700.

It should be noted that the DC dictionary 600 and the CD dictionary 700 shown in FIG. 10 are conceptual entities. Realization examples thereof will be described below.

Figure 11:
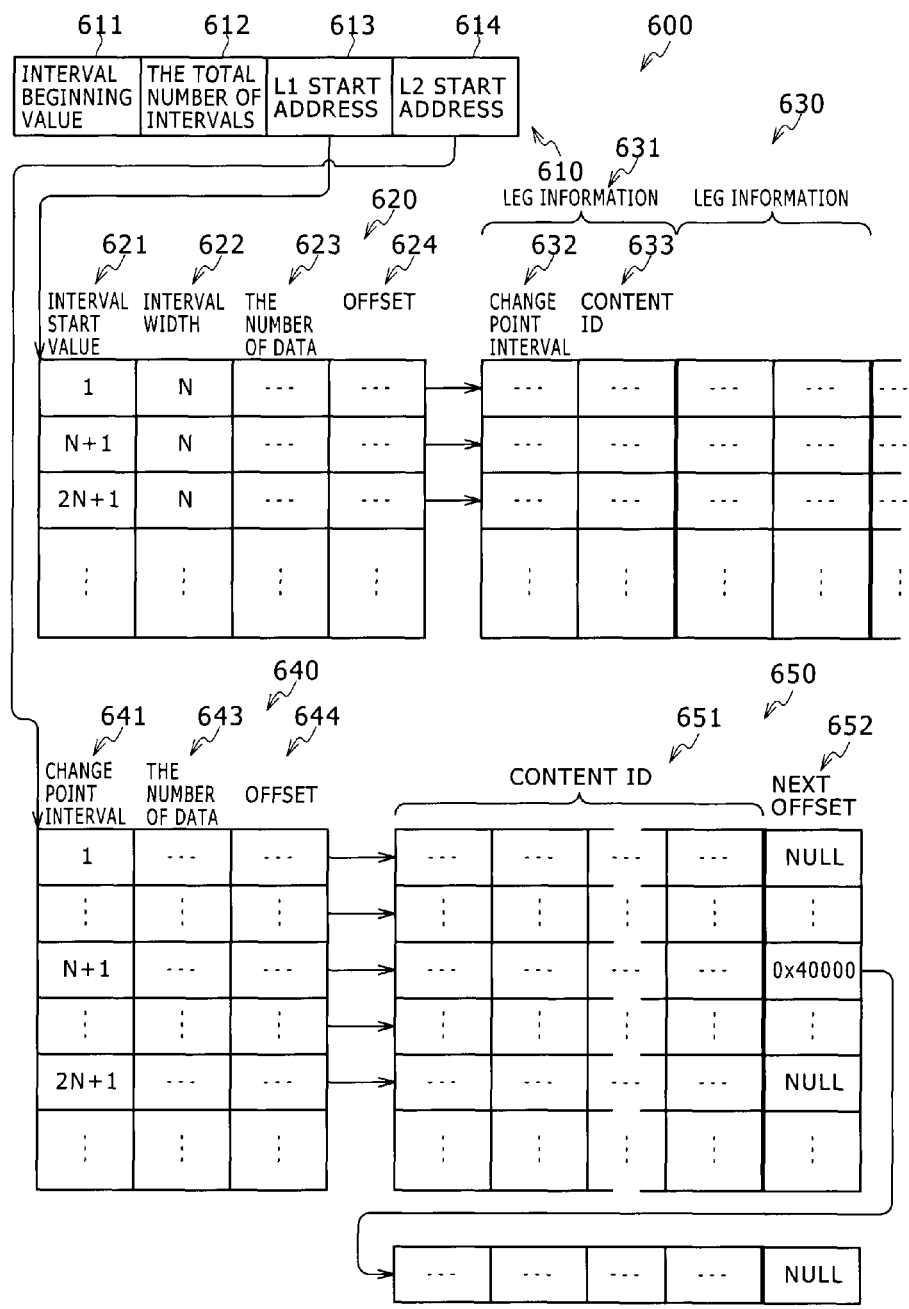
FIG. 11 is a diagram showing one configuration example of the DC dictionary according to the embodiment of the present invention.

FIG. 11 is a diagram showing one configuration example of the DC dictionary 600 in the embodiment of the present invention. This DC dictionary 600 has a layered structure of a first layer (620, 630) and a second layer (640, 650) that are subsequent to a header 610. Each of the first and second layers is composed of an index part and a unit part. The index part of the first layer will be referred to as an L1 index 620, and the unit part of the first layer will be referred to as an L1 unit 630. The index part of the second layer will be referred to as an L2 index 640, and the unit part of the second layer will be referred to as an L2 unit 650.

The header 610 includes an interval beginning value 611, the total number of intervals 612, an L1 start address 613, and an L2 start address 614. The interval beginning value 611 is a field in which the beginning value of the change point intervals that are stored in the DC dictionary 600 is stored. The total number of intervals 612 is a field in which the total number of change point intervals that are stored in the DC dictionary 600 is stored. The L1 start address 613 is a field in which the start address of the L1 index 620 is stored. The L2 start address 614 is a field in which the start address of the L2 index 640 is stored.

The L1 index 620 has a function as the index of the L1 unit 630. In each record of the L1 index 620, an interval start value 621, an interval width 622, the number of data 623, and an offset 624 are stored. The interval start value 621 is a field in which the start value of the change point intervals of the corresponding record is stored. The interval width 622 is a field in which the width (the number) of the change point intervals that should be included in the corresponding record is stored. The number of data 623 is a field in which the number of pieces of data (leg information) stored in the corresponding record of the L1 unit 630 is stored. The offset 624 is a field in which the pointer to the corresponding record of the L1 unit 630 is stored.

The leg information 631 is stored in the L1 unit 630 on a record-by-record basis. In the embodiment of the present invention, the leg information 631 includes fields of a change point interval 632 and a content ID 633. Specifically, as information relating to a leg between change points, the change point interval of the leg between change points and the content ID of moving image content including the leg between change points are stored. Plural sets of the leg information 631 can be stored in one record at consecutive addresses. It is desirable that the maximum storable number of sets of the leg information 631 per one record be equivalent to a fixed size common to all the records. In this case, even if the offset 624 is not stored in each record, it is possible to calculate the addresses of the respective records from the start address of the L1 unit 630.

The L2 index 640 has a function as the index of the L2 unit 650. In each record of the L2 index 640, a change point interval 641, the number of data 643, and an offset 644 are stored. The change point interval 641 is a field in which the change point interval of the corresponding record is stored. The number of data 643 is a field in which the number of pieces of data (content IDs) stored in the corresponding record of the L2 unit 650 is stored. The offset 644 is a field in which the pointer to the corresponding record of the L2 unit 650 is stored.

A content ID 651 is stored in the L2 unit 650 on a record-by-record basis. Plural content IDs 651 can be stored in one record at consecutive addresses. It is desirable that the maximum storable number of content IDs 651 per one record be equivalent to a fixed size common to all the records. In this case, even if the offset 644 is not stored in each record, it is possible to calculate the addresses of the respective records from the start address of the L2 unit 650.

Furthermore, in each record of the L2 unit 650, a next offset 652 for expanding the record can be stored. A value that does not indicate a specific address (null pointer) is set in the next offset 652 until the number of content IDs 651 stored in the corresponding record surpasses the maximum storable number of content IDs 651 per one record. If a new record is expanded, the pointer to the expanded record is held in the next offset 652. For example, in FIG. 11, an address "0x40000" is held in the next offset 652 of the record whose change point interval 641 is "N+1", and thereby record expansion is indicated.

Assuming that the size of the memory space is 32 bits, the size of the respective fields of the DC dictionary 600 can be standardized to 4 bytes.

If the frame is employed as the unit of the change point interval, the value of the change point interval can take any of all integers larger than zero, and hence there is no upper limit to the change point interval. Furthermore, there is no upper limit also to the content ID. Therefore, all of the DC dictionary 600 can not be stored in one storage having a limited size in some cases. To address this problem, in the embodiment of the present invention, the DC dictionary 600 has the layered structure of the first layer and the second layer. Due to this structure, the embodiment of the present invention can cover even the case in which the architecture of processors and memories has a hierarchical storage. The data stored in the first layer is transferred to the second layer if a predetermined condition is satisfied as described later.

Although there is no upper limit to the change point interval originally, it is effective to set the upper limit thereof for realizing the DC dictionary 600. For example, the upper limit equivalent to about one minute may be set based on past distribution of change point intervals, and a record for "change point intervals longer than the upper limit" may be set for change point intervals surpassing the upper light. Alternatively, if a change point interval surpassing the upper limit exists, this change point interval may be registered not in the first layer but in the second layer directly. If the possibility that a change point interval surpassing the upper limit exists is low, no large influence will be imposed on the performance even when registration in the second layer by byte transfer is carried out.

In this DC dictionary 600, the size of the second layer is typically larger than that of the first layer. In the second layer, records are provided for all change point intervals individually (see the change point interval 641). In contrast, in the first layer, one record is assigned to plural change point intervals (see the interval width 622). Therefore, the number of records in the first layer can be decreased more greatly. For example, in FIG. 11, N change point intervals are stored per one record in the first layer, and the individual change point intervals are stored in the change point interval 632.

Although the example of FIG. 11 has the layered structure of the first layer and the second layer, the number of layers is not particularly limited. Specifically, because the size of the L2 unit 650 in the second layer is also finite, data may be transferred to another storage from the L2 unit 650 if the amount of data stored in the L2 unit 650 surpasses the allowable amount.

Figure 12:
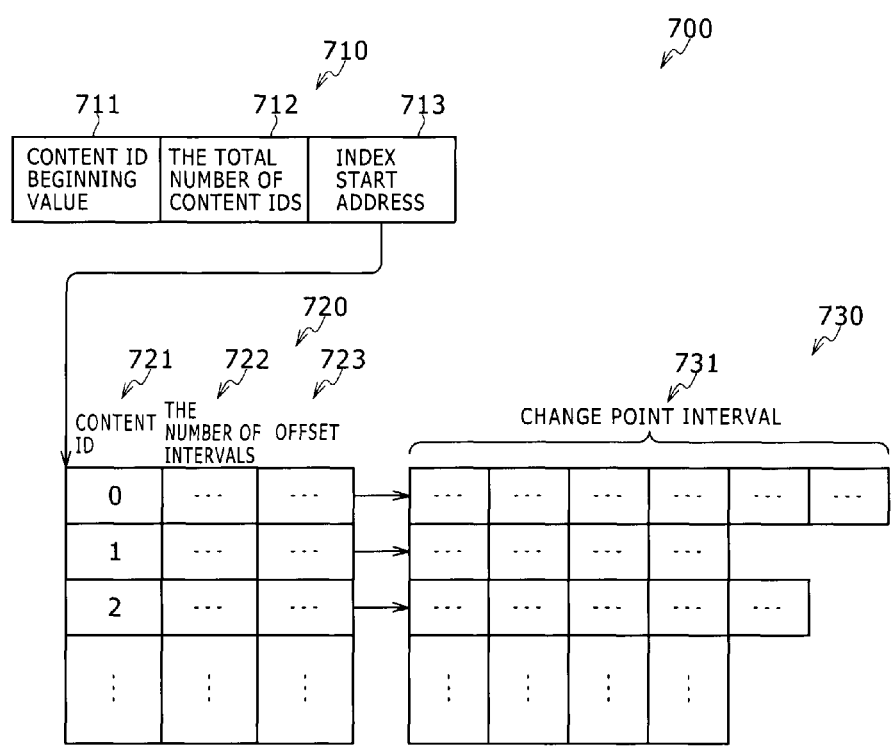
FIG. 12 is a diagram showing one configuration example of the CD dictionary according to the embodiment of the present invention.

FIG. 12 is a diagram showing one configuration example of the CD dictionary 700 in the embodiment of the present invention. This CD dictionary 700 includes a header 710, an index 720, and a unit 730.

The header 710 includes a content ID beginning value 711, the total number of content IDs 712, and an index start address 713. The content ID beginning value 711 is a field in which the beginning value of the content IDs that are stored in the CD dictionary 700 is stored. The total number of content IDs 712 is a field in which the total number of content IDs that are stored in the CD dictionary 700 is stored. The index start address 713 is a field in which the start address of the index 720 is stored.

The index 720 has a function as the index of the unit 730. In each record of the index 720, a content ID 721, the number of intervals 722, and an offset 723 are stored. The content ID 721 is a field in which the content ID of the corresponding record is stored. The number of intervals 722 is a field in which the number of change point intervals stored in the corresponding record of the unit 730 is stored. The offset 723 is a field in which the pointer to the corresponding record of the unit 730 is stored.

A change point interval 731 is stored in the unit 730 on a record-by-record basis. Plural change point intervals 731 can be stored in one record in the time-series order at consecutive addresses. The maximum storable number of change point intervals 731 per one record may be different from record to record. However, the entire unit 730 should be stored at consecutive addresses physically.

For this CD dictionary 700, employing a layered structure formed of layers having different record assignment ways like that of the DC dictionary 600 is not envisaged. This is because a change point interval list has a certain amount of length and collective access thereto is possible. However, because the size of the unit 730 itself is finite, data may be transferred to another storage from the unit 730 if the amount of data stored in the unit 730 surpasses the allowable amount.

Assuming that the size of the memory space is 32 bits, the size of the respective fields of the CD dictionary 700 can be standardized to 4 bytes.

Figure 13:
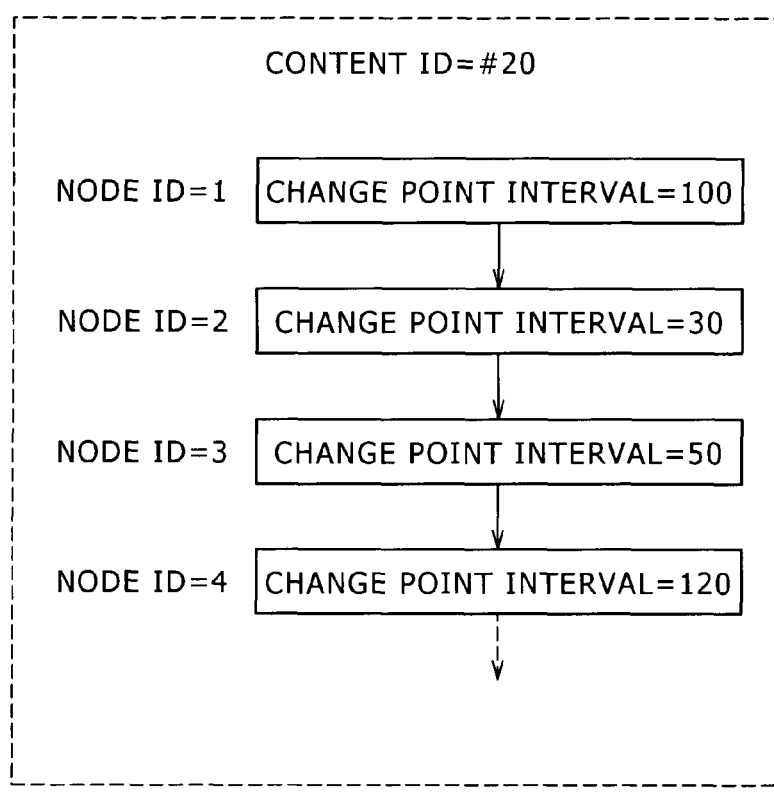
FIG. 13 is a diagram showing an example of a change point interval list according to the embodiment of the present invention.

FIG. 13 is a diagram showing an example of the change point interval list in the embodiment of the present invention. In this example, the change point intervals corresponding to the beginning four nodes of the change point interval list relating to moving image content having a content ID of "#20" are shown in a time-series manner. The respective nodes are given node IDs in the increasing order from one.

In the first node (node ID: 1), "100" is stored as a change point interval. In the second node (node ID: 2) "30" is stored as a change point interval. In the third node (node ID: 3), "50" is stored as a change point interval. In the fourth node (node ID: 4), "120" is stored as a change point interval.

An example in which this change point interval list is registered in the DC dictionary 600 and the CD dictionary 700 will be described below.

Figure 14:
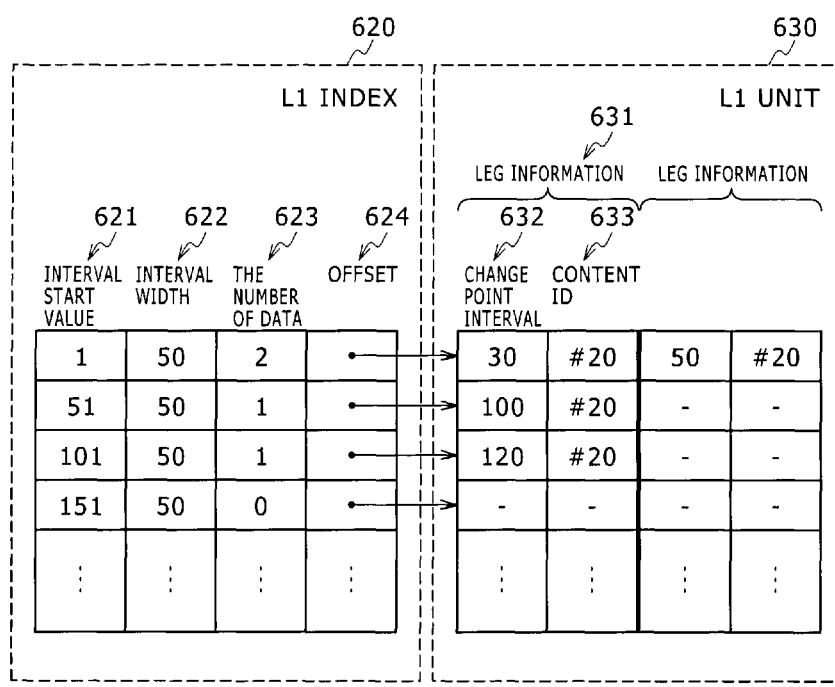
FIG. 14 is a diagram showing an example in which the change point interval list of FIG. 13 is registered in a first layer of the DC dictionary according to the embodiment of the present invention.

FIG. 14 is a diagram showing an example in which the change point interval list of FIG. 13 is registered in the first layer of the DC dictionary 600 according to the embodiment of the present invention. In this example, all the interval width 622 is set to 50. A change point interval in the range of 1 to 50 is stored in the first record. A change point interval in the range of 51 to 100 is stored in the second record. A change point interval in the range of 101 to 150 is stored in the third record. A change point interval in the range of 151 to 200 is stored in the fourth record.

In the example of FIG. 13, moving image content whose content ID is "#20" has change point intervals of "100", "30", "50", and "120". Therefore, in the first record of the L1 unit 630, "30" and "50" are stored as the change point interval 632, and "#20" is so stored as the content ID 633 as to be associated with each change point interval 632.

In the second record of the L1 unit 630, "100" is stored as the change point interval 632, and "#20" associated with this "100" is stored as the content ID 633. In the third record of the L1 unit 630, "120" is stored as the change point interval 632, and "#20" associated with this "120" is stored as the content ID 633.

In association with this storing, the number of pieces of data (leg information) stored in the corresponding record of the L1 unit 630 is stored in the number of data 623. Specifically, "2", "1", and "1" are stored in the number of data 623 of the first, second, and third records, respectively.

Figure 15:
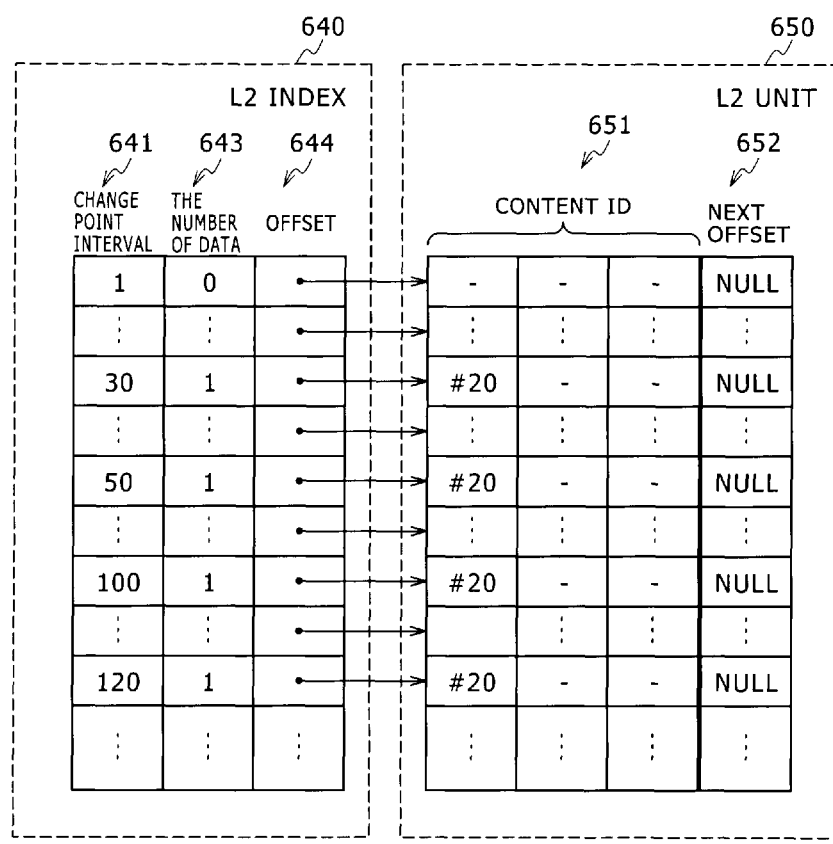
FIG. 15 is a diagram showing an example in which the change point interval list of FIG. 13 is registered in a second layer of the DC dictionary according to the embodiment of the present invention.

FIG. 15 is a diagram showing an example in which the change point interval list of FIG. 13 is registered in the second layer of the DC dictionary 600 according to the embodiment of the present invention. The data that is registered in the first layer of the DC dictionary 600 as shown in FIG. 14 is transferred to the second layer as described below.

In the second layer of the DC dictionary 600, a record is assigned to each change point interval. Specifically, in the change point interval 641, values arising from one-by-one increments from one are stored.

In the example of FIG. 13, moving image content whose content ID is "#20" has change point intervals of "100", "30", "50", and "120". Therefore, "#20" is stored in the content ID 651 of the records whose change point interval 641 indicates "30", "50", "100", and "120", respectively.

Figure 16:
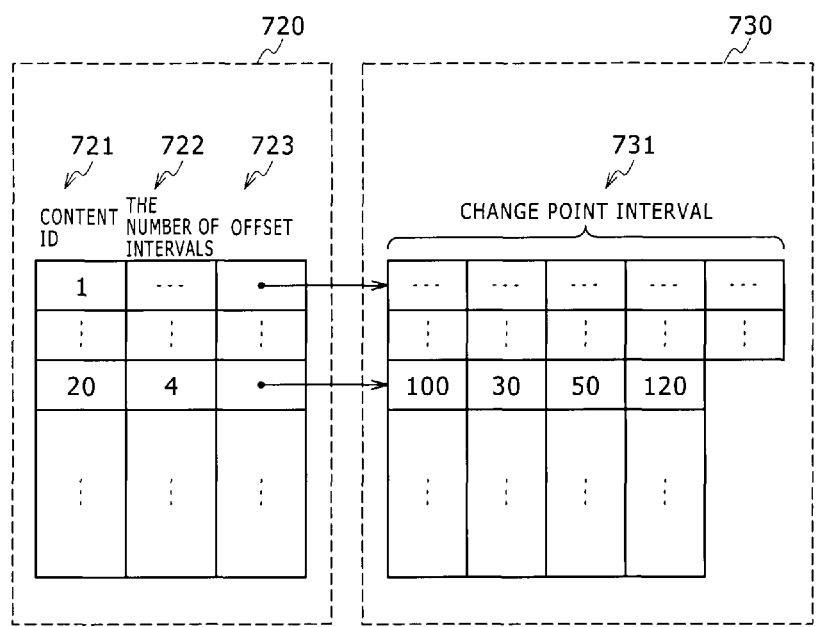
FIG. 16 is a diagram showing an example in which the change point interval list of FIG. 13 is registered in the CD dictionary according to the embodiment of the present invention.

FIG. 16 is a diagram showing an example in which the change point interval list of FIG. 13 is registered in the CD dictionary 700 according to the embodiment of the present invention. In the example of FIG. 13, moving image content whose content ID is "#20" has change point intervals of "100", "30", "50", and "120". Therefore, "100", "30", "50", and "120" are stored in the change point interval 731 of the record whose content ID 721 indicates "20". Furthermore, "4" is stored as the number of intervals 722 of the record whose content ID 721 indicates "20".

Next, processing of transfer between layers in the embodiment of the present invention will be described below with reference to diagrams.

Figure 17:
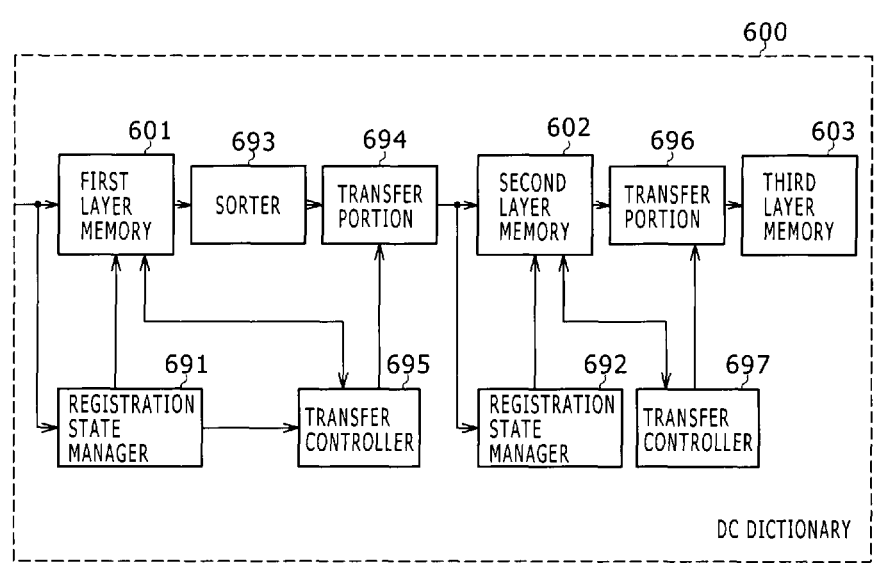
FIG. 17 is a diagram showing a configuration example relating to transfer in the DC dictionary according to the embodiment of the present invention.

FIG. 17 is a diagram showing a configuration example relating to transfer in the DC dictionary 600 according to the embodiment of the present invention. The DC dictionary 600 shown in FIG. 17 includes a first layer memory 601, a second layer memory 602, a third layer memory 603, registration state managers 691 and 692, a sorter 693, transfer portions 694 and 696, and transfer controllers 695 and 697.

The first layer memory 601 stores the first layer (620, 630) described with FIG. 11. The second layer memory 602 stores the second layer (640, 650) described with FIG. 11. If the stored-data amount of the second layer surpasses the allowable amount thereof, a part or all of the data stored as the second layer is stored as a third layer in the third layer memory 603. As described later, various forms will be available as realization examples of the first layer memory 601, the second layer memory 602, and the third layer memory 603. For example, under a multi-processor environment, the following form will be envisaged: the first layer memory 601 is realized by a local memory, the second layer memory 602 is realized by a common main memory, and the third layer memory 603 is realized by a high-capacity hard disk.

The registration state manager 691 manages the registration state of the first layer. The registration state manager 692 manages the registration state of the second layer. As the registration state, e.g. the number of pieces of data registered in the first layer or the second layer (the leg information 631 or the content ID 651) is counted.

The sorter 693 sorts pieces of the leg information 631 stored in the first layer memory 601 in the record. In the L1 unit 630, pieces of the leg information 631 are accumulated at random. On the other hand, in the second layer, content IDs are distributed based on the order of the change point interval. Therefore, a sort should be carried out for transfer from the first layer to the second layer. Thus, this sorter 693 carries out a sort based on the order of the change point interval for transfer. Although a sort is carried out before transfer in this example, a sort may be carried out after transfer. In the second layer, content IDs are stored in the order of the change point interval. Therefore, there is no need to carry out a sort for transfer from the second layer to the third layer.

The transfer portion 694 carries out transfer from the first layer to the second layer. The transfer portion 696 carries out transfer from the second layer to the third layer.

The transfer controller 695 controls the transfer from the first layer to the second layer. The transfer controller 697 controls the transfer from the second layer to the third layer. These transfer controllers 695 and 697 control the transfer by the transfer portions 694 and 696 based on the registration states managed by the registration state managers 691 and 692, respectively. As for the transfer timing, the transfer processing may be activated e.g. when the stored-data amount surpasses the allowable amount in one record. Alternatively, the transfer processing may be activated every time a predetermined number of data are registered in all the records as a whole. In the former case, it is desirable that the record size (the maximum storable amount of the leg information 631 and the content ID 651) be adjusted in advance so that the transfer processing may be activated with the same probability for all the records statistically.

The data in the L1 unit 630 and the L2 unit 650 are stored at consecutive addresses physically. Therefore, the transfer portions 694 and 696 can carry out burst transfer on a record-by-record basis, which allows high-speed transfer processing. Due to this burst transfer, the record size of the L1 unit 630 (the maximum storable amount of the leg information 631) can be decided corresponding to byte alignment. For example, when 128-byte alignment is necessary, the record size U of the L1 unit 630 is represented by the following equation if the size of each of the change point interval 632 and the content ID 633 is 4 bytes.

$$U = 128 \times i / (4+4)$$

where i denotes an integer larger than zero.

FIG. 18 is a diagram showing one example of a sort by the sorter 693 in the embodiment of the present invention. In this example, a publicly-known distribution counting sort is employed as the sort method. In this method, although a certain work area is unnecessary, comparison of the value magnitude of data is unnecessary and thus a high-speed sort is possible. Furthermore, this method can deal with even data including a plurality of the same keys. However, the range of the values of the sort-subject data needs to be determined in advance. This necessity can be met by setting the upper limit to the change point interval as described above.

FIG. 18A shows a data array of the leg information 631 in the L1 unit 630 as the sort subject. The respective data are given index values in the increasing order from zero. Each data has a change point interval and a content ID. In the embodiment of the present invention, the sort is carried out in such a way that the change point interval is used as the sort key.

FIG. 18B shows a data array for work of storing the numbers of times of the appearance of the change point interval, serving as the key. In this example, "1" is stored as the number of times of the appearance of the change point interval "1", "2" is stored as that of the change point interval "3", "1" is stored as that of the change point interval "4", and "1" is stored as that of the change point interval "5". The number of times of appearance is represented as X.

FIG. 18C shows a data array for work of storing cumulative frequencies of the number of times of the appearance of the change point interval, serving as the key. In this example, cumulative frequencies of the number X of times of appearance are counted along the increasing order of the change point interval. The cumulative frequency is represented as Y.

FIG. 18D shows a data array obtained after the sort. In this sort method, the data of the resulting data array are arranged in the increasing order of the change point interval, serving as the key. The index values in this resulting data array depend on the numbers X of times of appearance and the cumulative frequencies Y corresponding to the respective change point intervals. Specifically, each change point interval is given one index value equal to "Y–X" of this change point interval when X is one, or given plural index values that are from "Y–X" to "Y–1" of this change point interval when X is larger than one. In the case of the example of FIG. 18D, in which there are two data whose change point interval indicates "3", the change point interval "3" is given "1" and "2" as its index values because the number X and the cumulative frequency Y of the change point interval "3" are "2" and "3", respectively.

In this way, the data of the leg information 631 in the L1 unit 630 is sorted for transfer, with the change point interval used as the sort key.

Figure 19:
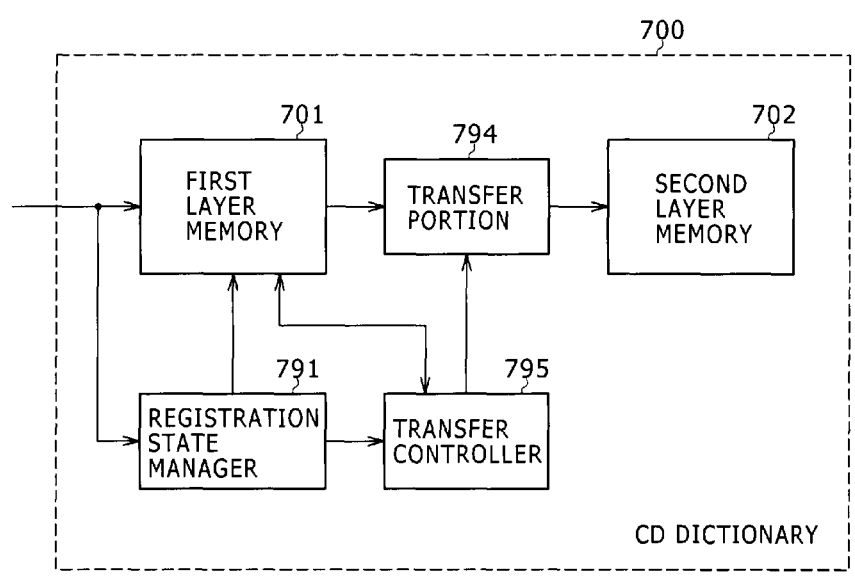
FIG. 19 is a diagram showing a configuration example relating to transfer in the CD dictionary according to the embodiment of the present invention.

FIG. 19 is a diagram showing a configuration example relating to transfer in the CD dictionary 700 according to the embodiment of the present invention. This CD dictionary 700 of FIG. 19 includes a first layer memory 701, a second layer memory 702, a registration state manager 791, a transfer portion 794, and a transfer controller 795.

The first layer memory 701 stores the index 720 and the unit 730 described with FIG. 12 as the first layer. If the amount of data stored in the index 720 and the unit 730 surpasses the allowable amount thereof, a part or all of the data stored as the first layer is stored in the second layer memory 702 as the second layer. Although the CD dictionary 700 does not have a layered structure formed of layers having different record assignment ways unlike the DC dictionary 600, the CD dictionary 700 is so controlled that the data stored therein can be saved to e.g. a high-capacity hard disk if the stored-data amount thereof surpasses its allowable amount.

The registration state manager 791 manages the registration state of the index 720 and the unit 730. As this registration state, e.g. the number of change point intervals 731 registered in the unit 730 is counted.

The transfer portion 794 carries out transfer from the first layer (720, 730) to the second layer. The transfer controller 795 controls the transfer from the first layer to the second layer. Specifically, based on the registration state managed by the registration state manager 791, the transfer controller 795 controls the transfer by the transfer portion 794 so that the transfer may be activated if the stored-data amount surpasses the allowable amount in one record. In general, a somewhat large number of change point intervals 731 are stored in each record in the CD dictionary 700. Thus, the transfer portion 794 can carry out burst transfer on a record-by-record basis, which allows high-speed transfer processing.

FIG. 20 is a diagram showing arrangement examples of the DC dictionary 600 and the CD dictionary 700 in the embodiment of the present invention.

Figure 20A:
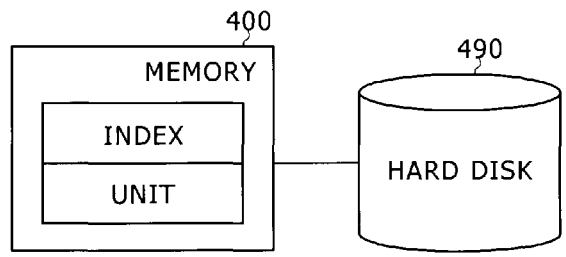
FIGS. 20A to 20D are diagrams showing arrangement examples of the DC dictionary and the CD dictionary according to the embodiment of the present invention.
Figure 20B:
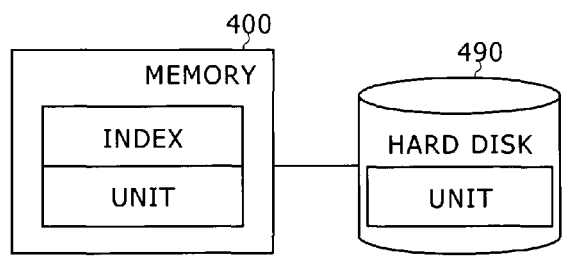

FIG. 20A shows an arrangement example when the capacity of a memory 400 in a processing device is sufficiently high. In this case, operation can be completed only by the memory 400 in the processing device. Therefore, the DC dictionary 600 and the CD dictionary 700 are disposed not in a hard disk 490 but only in the memory 400. FIG. 20B shows an arrangement example when the capacity of the memory 400 in the processing device is low. In this case, operation can not be completed only by the memory 400 in the processing device. Therefore, in addition to the placement of the DC dictionary 600 and the CD dictionary 700 in the memory 400, the units (630, 650, 730) are disposed also in the hard disk 490 if the stored-data amount of the memory 400 surpasses the allowable amount thereof.

Figure 20C:
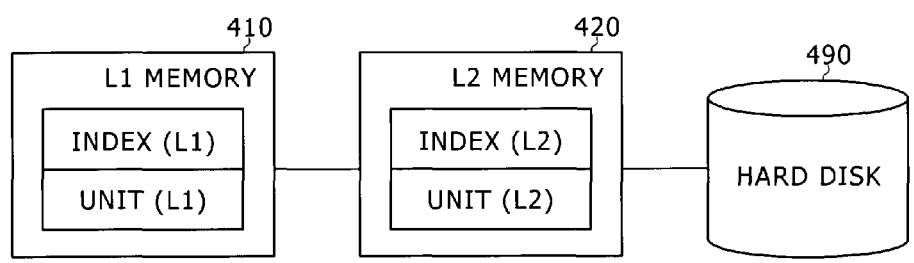
Figure 20D:
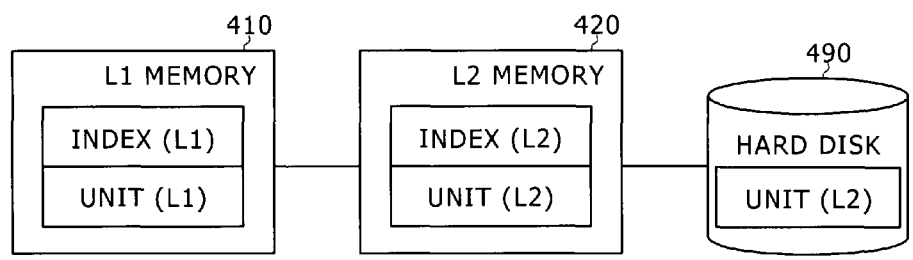

FIGS. 20C and 20D show arrangement examples when a two-layer memory structure is employed. In this case, the first layer (620, 630) of the DC dictionary 600 is disposed in an L1 memory 410, and the second layer (640, 650) is disposed in an L2 memory 420. The CD dictionary 700 is disposed in the L1 memory 410 or the L2 memory 420. If the capacity of the L2 memory 420 is sufficiently high, the DC dictionary 600 and the CD dictionary 700 are disposed as shown in FIG. 20C and no entity is disposed in the hard disk 490. On the other hand, if the capacity of the L2 memory 420 is low, in addition to the placement of the DC dictionary 600 and the CD dictionary 700 in the L1 memory 410 and the L2 memory 420, the L2 unit 650 or the unit 730 is disposed also in the hard disk 490 if the stored-data amount of the L2 memory 420 surpasses the allowable amount thereof.

In this manner, the embodiment of the present invention can be flexibly applied to various platforms having different layered structures of storage.

Figure 21:
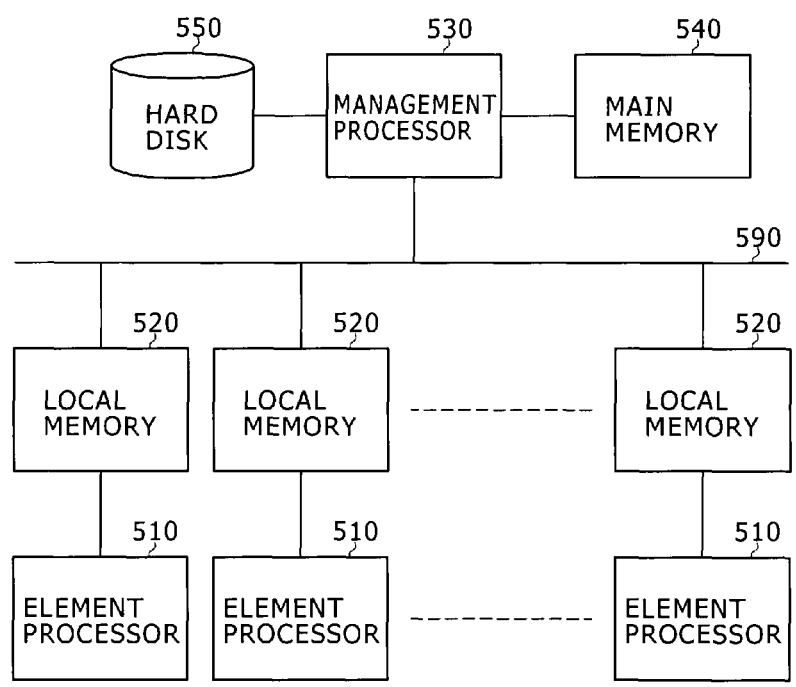
FIG. 21 is a diagram showing a configuration example of a multi-processor system having a two-layer memory structure.

FIG. 21 is a diagram showing a configuration example of a multi-processor system having a two-layer memory structure. This multi-processor system includes plural element processors 510, local memories 520 that each correspond to a respective one of the element processors 510, a management processor 530, a main memory 540, a hard disk 550, and a bus 590 that connects the management processor 530 to the local memories 520.

The plural element processors 510 form the multi-processor. These element processors 510 can execute processing in parallel in synchronization with other element processors 510. The local memories 520 are each provided corresponding to a respective one of the element processors 510, and the data in the local memory 520 is used for the processing by the corresponding element processor 510.

The management processor 530 manages the entire multi-processor system, and controls data transfer between the local memory 520 and the main memory 540 via the bus 590. The main memory 540 is utilized by the management processor 530 and shared by all the element processors 510.

The hard disk 550 is a high-capacity storage that is used as an auxiliary memory of the multi-processor system and offers a file system.

This multi-processor system has a two-layer memory structure. The local memory 520 is equivalent to the L1 memory 410 of FIG. 20. The main memory 540 is equivalent to the L2 memory 420 of FIG. 20. The hard disk 550 is equivalent to the hard disk 490 of FIG. 20. The embodiment of the present invention can be applied also to a system in which the capacity of the local memory 520 is low (e.g. 256 Kbytes) and the capacity of the main memory 540 is comparatively high (e.g. 1 Gbyte or higher).

A description will be made below about the fact that registration and check of moving image content can be executed in parallel in such a multi-processor system.

Figure 22:
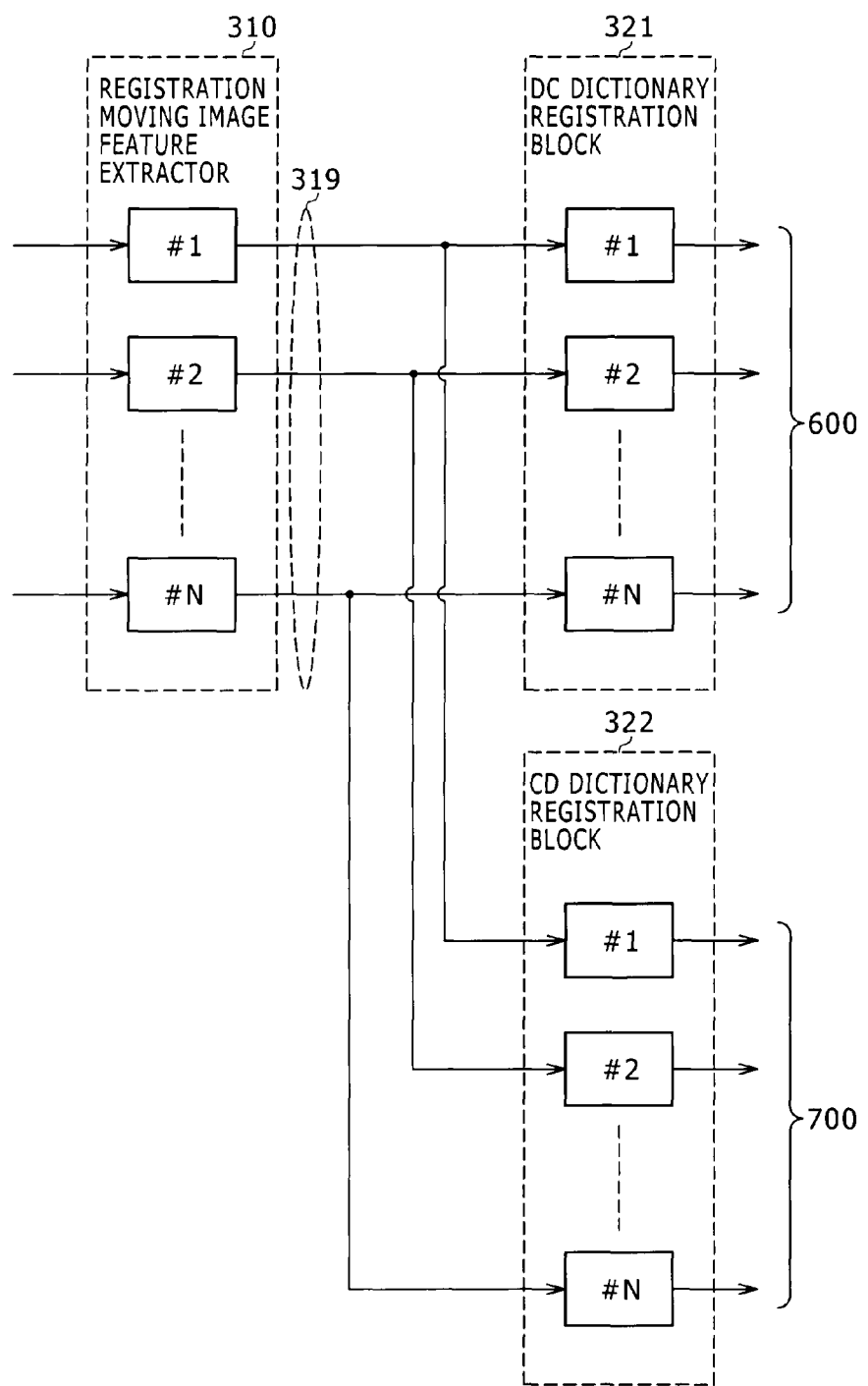
FIG. 22 is a diagram showing an example of processing of registering moving image content according to the embodiment of the present invention, in a multi-processor system.

FIG. 22 is a diagram showing an example of the processing of registering moving image content according to the embodiment of the present invention, in a multi-processor system. In this example, N (N denotes an integer larger than one) element processors 510 are assigned to the registration moving image feature extractor 310, and outputs from these processors are supplied to the DC dictionary registration block 321 and the CD dictionary registration block 322. Also to each of the DC dictionary registration block 321 and the CD dictionary registration block 322, N element processors 510 are assigned.

In the registration moving image feature extractor 310, processing of extracting change point interval lists is executed for N registration moving images in parallel. The DC dictionary registration block 321 registers the extracted N change point interval lists in the DC dictionary 600. In this registration in the DC dictionary 600, exclusive control is carried out among the N element processors 510 in order to keep the registration consistency. Similarly, the CD dictionary registration block 322 registers the extracted N change point interval lists in the CD dictionary 700. In this registration in the CD dictionary 700, exclusive control is carried out among the N element processors 510 in order to keep the registration consistency.

Figure 23:
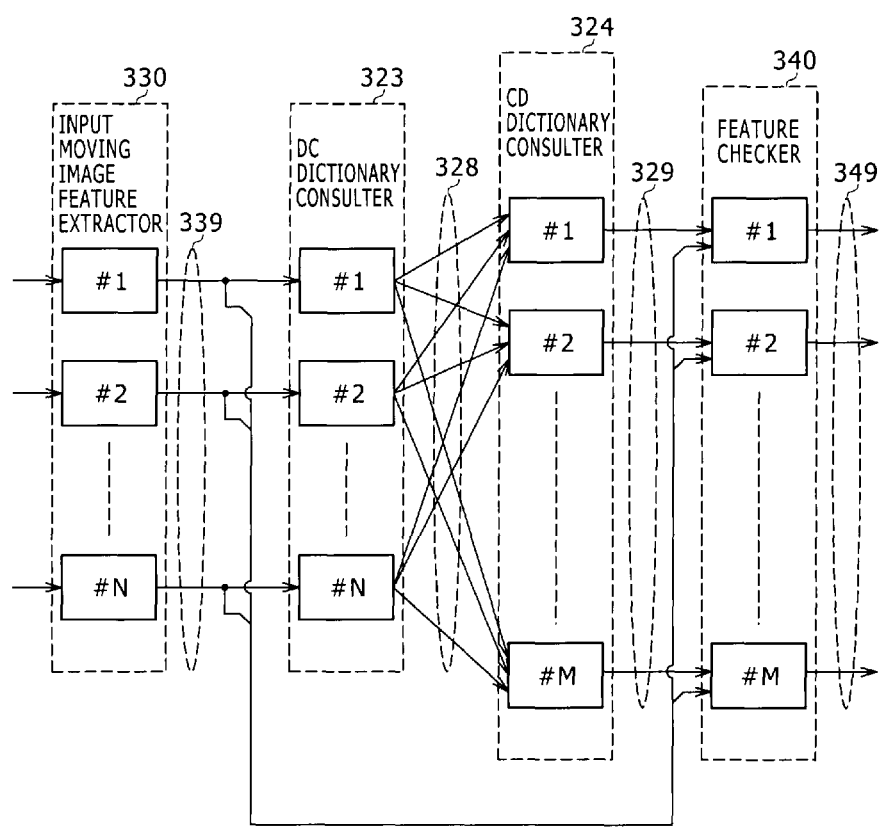
FIG. 23 is a diagram showing an example of processing of checking moving image content according to the embodiment of the present invention, in a multi-processor system.

FIG. 23 is a diagram showing an example of the processing of checking moving image content according to the embodiment of the present invention, in a multi-processor system. In this example, N element processors 510 are assigned to each of the input moving image feature extractor 330 and the DC dictionary consulter 323. Furthermore, M (M denotes an integer larger than one) element processors 510 are assigned to each of the CD dictionary consulter 324 and the feature checker 340.

In the input moving image feature extractor 330, processing of extracting change point interval lists is executed for N input moving images in parallel. The DC dictionary consulter 323 consults the DC dictionary 600 by using the change point intervals included in the extracted N change point interval lists as the consultation key. M content IDs are read out from the DC dictionary 600. The CD dictionary consulter 324 consults the CD dictionary 700 by using the read-out M content IDs as the consultation key. M change point interval lists are read out from the CD dictionary 700. The feature checker 340 checks the input N change point interval lists against the read-out M change point interval lists.

In terms of the processing for one input moving image, the following four stages of processing need to be sequentially carried out: the feature extraction, the DC dictionary consultation, the CD dictionary consultation, and the feature check. However, even when plural moving images are input, parallel processing for these input moving images by N element processors 510 is possible because there is no data-dependence relationship among these input moving images. Furthermore, during the DC dictionary consultation for certain one input moving image after the feature extraction for this input moving image, the feature extraction for another input moving image may be started. This allows execution of overlapped processing in a pipeline manner.

Next, the operation of the content retrieval device according to the embodiment of the present invention will be described below with reference to diagrams.

Figure 24:
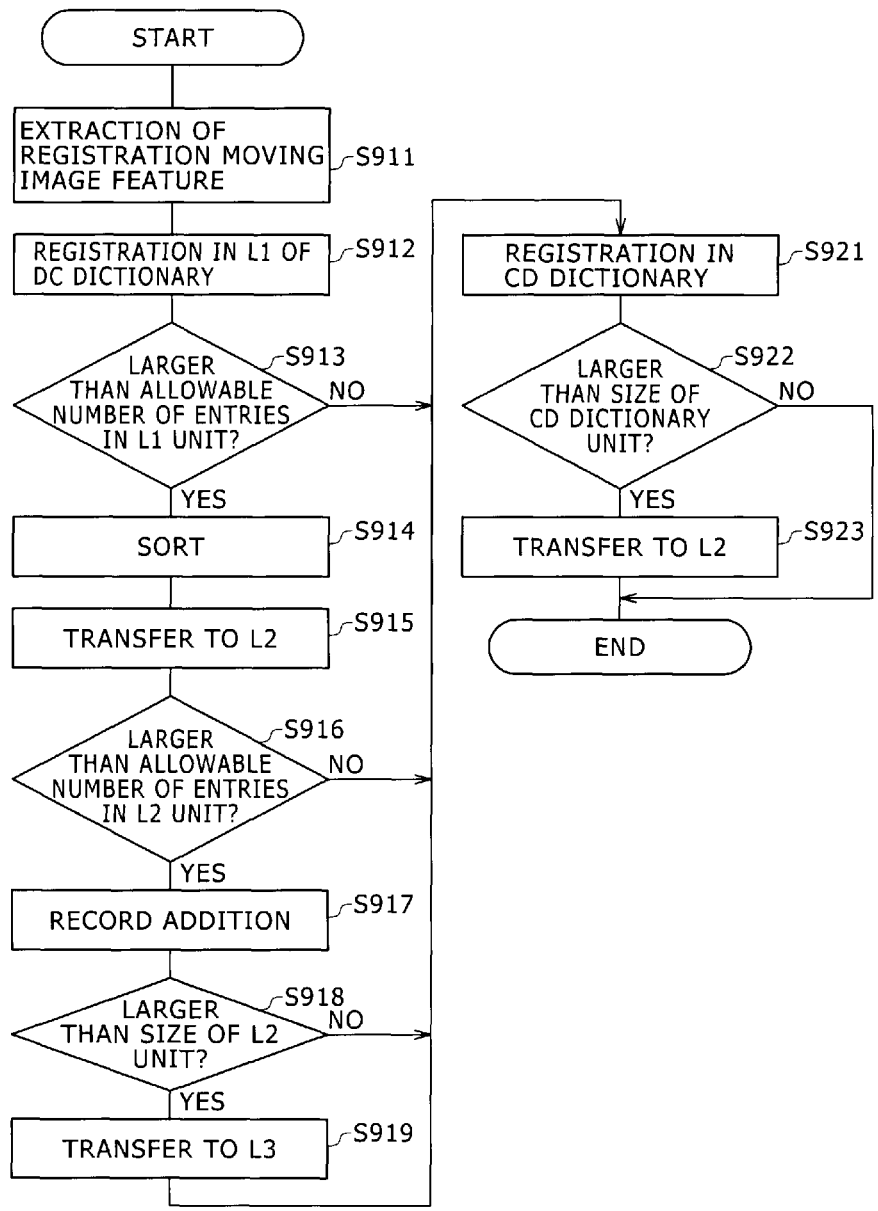
FIG. 24 is a flowchart showing one example of the procedure of feature registration processing according to the embodiment of the present invention.

FIG. 24 is a flowchart showing one example of the procedure of the feature resistration processing according to the embodiment of the present invention.

Upon inputting of moving image content as the registration subject (registration moving image), a feature (change point interval list) is extracted by the registration moving image feature extractor 310 (step S911). The extracted change point interval list is registered in the first layer of the DC dictionary 600 by the DC dictionary registration block 321 (step S912). If at this time the data amount of the corresponding record of the L1 unit 630 surpasses the maximum allowable number of entries of the leg information 631 (step S913), the sorter 693 carries out a sort for this record by using the change point interval 632 as the sort key (step S914), and then transfer to the second layer is carried out by the transfer portion 694 (step S915).

If the transfer to the second layer (step S915) causes the data amount of the corresponding record of the L2 unit 650 to surpass the maximum allowable amount of entries of the content ID 651 (step S916), a new record is added to the L2 unit 650 (step S917). If this record addition causes the data amount of the entire L2 unit 650 to surpass the allowable amount thereof (step S918), the transfer portion 696 transfers a part or all of the data stored as the second layer to a third layer (e.g. hard disk) (step S919).

Furthermore, the change point interval list extracted by the registration moving image feature extractor 310 is registered in the CD dictionary 700 by the CD dictionary registration block 322 (step S921). If at this time the data amount of the entire unit 730 surpasses the allowable amount thereof (step S922), the transfer portion 794 transfers a part or all of the data stored in the unit 730 to a second layer (e.g. hard disk) (step S923).

Figure 25:
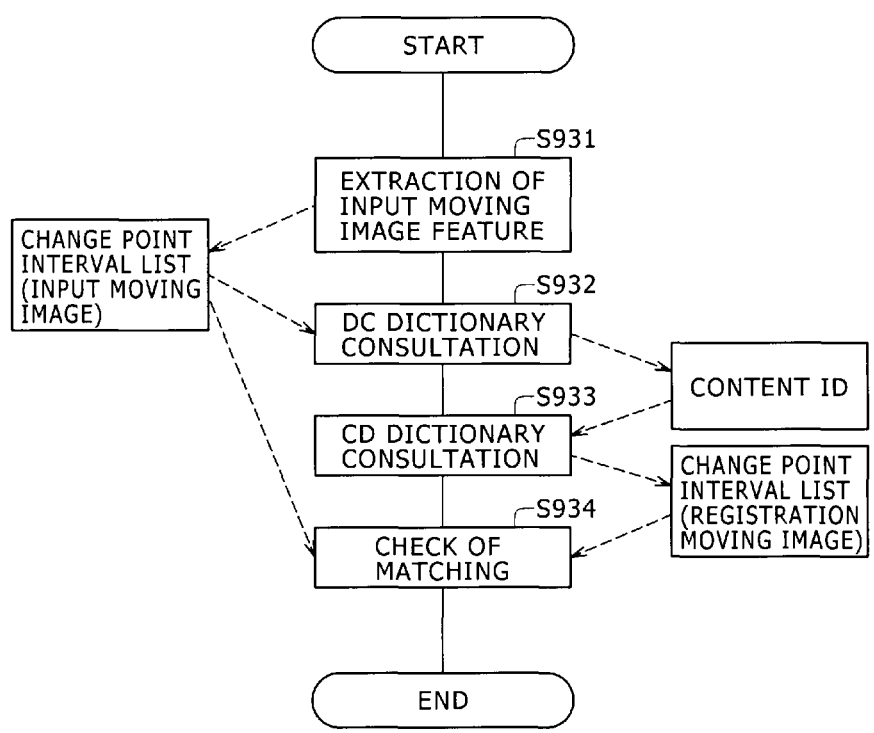
FIG. 25 is a flowchart showing one example of the procedure of feature check processing according to the embodiment of the present invention.

FIG. 25 is a flowchart showing one example of the procedure of the feature check processing according to the embodiment of the present invention.

Upon inputting of moving image content as the retrieval subject (input moving image), a feature (change point interval list) is extracted by the input moving image feature extractor 330 (step S931). The DC dictionary consulter 323 consults the DC dictionary 600 by using the change point intervals included in the extracted change point interval list as the consultation key (step S932). Due to this step, content IDs are read out.

Subsequently, the CD dictionary consulter 324 consults the CD dictionary 700 by using the read-out content IDs as the consultation key (step S933). Due to this step, the change point interval lists of registration moving images are read out.

Subsequently, the feature checker 340 checks the change point interval list of the input moving image against the change point interval lists of the registration moving images, to thereby determine whether or not both the moving images match each other (step S934).

As described above, in the embodiment of the present invention, the change point interval is employed as the feature of moving image content, which allows reduction in the amount of the feature that should be extracted. Furthermore, the feature database 320 is provided with the DC dictionary 600 for reading-out of content IDs by use of change point intervals as the consultation key in addition to the CD dictionary 700 for reading-out of change point interval lists by use of content IDs as the consultation key. This feature allows efficient acquisition of the change point interval lists of the registration moving images that have the same change point intervals as those included in the change point interval list of the input moving image. Thus, by checking the change point interval list of the input moving image against the change point interval lists of registration moving images, determination as to matching of both the moving images can be made.

In the embodiment of the present invention, the content ID 633 associated with the change point interval 632 is stored in the L1 unit 630 of the DC dictionary 600. In addition, the node ID in the change point interval list may also be stored therein as follows.

Figure 26:
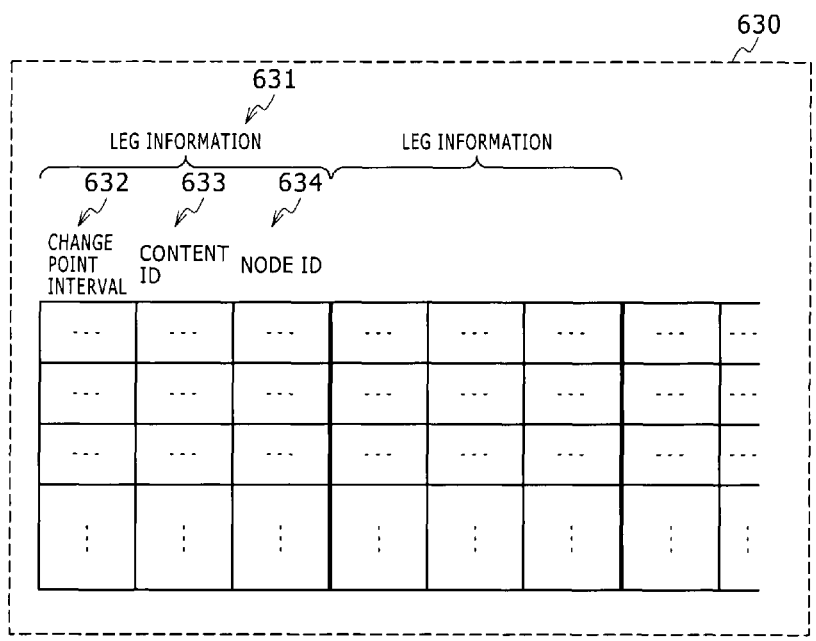
FIG. 26 is a diagram showing a modification example of an L1 unit of the DC dictionary according to the embodiment of the present invention.

FIG. 26 is a diagram showing a modification example of the L1 unit 630 of the DC dictionary 600 in the embodiment of the present invention. This modification example of the L1 unit 630 is different from the L1 unit 630 of FIG. 11 in that a node ID 634 of a change point interval list is further stored as the leg information 631.

Due to the provision of the node ID 634 like in this modification example, it is possible in consultation of the CD dictionary 700 to read out only change point intervals in the vicinity of the necessary node IDs without reading-out of all the change point interval lists (the change point intervals 731) of the corresponding content IDs. Thus, high-speed access to the CD dictionary 700 is possible. Furthermore, a sort by use of the node ID 634 can be carried out for transfer from the first layer to the second layer, which allows high-speed transfer.

The processing procedure described above for the embodiment of the present invention may be interpreted as a method including the procedure.

It should be understood by those skilled in the art that various modifications, combinations, sub-combinations and alternations may occur depending on design requirements and other factors insofar as they are within the scope of the appended claims or the equivalent thereof.

What is claimed is:
1. A data processing device, comprising:
circuitry configured to
store, in a first memory, identification information for identification of video data based on a time where a predetermined feature occurs within the video data, the time being measured according to a time scale of the video data;
store, in a second memory, the predetermined feature included in the video data in association with the identification information for identification of the video data;
read out the identification information stored in the first memory based on a feature included in input video data;
read out the predetermined feature stored in the second memory based on the identification information;
compare input feature time information of the feature included in the input video data with predetermined feature time information of the predetermined feature;
determine that the input video data matches video data corresponding to the predetermined feature when the input feature time information matches the predetermined feature time information; and
when the input feature time information does not match the predetermined feature time information, the circuitry is further configured to add subsequent time information to a smaller one of the input feature time information and the predetermined feature time information to generate new time information, and compare the new time information to a larger of the input feature time information and the predetermined feature time information to determine whether or not the input video data matches the video data corresponding to the predetermined feature.

2. The data processing device according to claim 1, wherein the predetermined feature time information of predetermined feature includes a change point interval that indicates an interval between change points.

3. The data processing device according to claim 2, wherein the circuitry is further configured to:

store, in a first layer storage of the first memory, pieces of the identification information at consecutive addresses in units of pieces of the identification information that are each associated with one of the change point intervals in a predetermined range; and store, in a second layer storage of the first memory, pieces of the identification information of the video data at consecutive addresses in units of pieces of the identification information that are each associated with one change point interval.

4. The data processing device according to claim 3, further comprising:

circuitry configured to sort pieces of the identification information in accordance with the change point intervals in the predetermined range, when a number of stored pieces of the identification information stored in the first layer storage of the first memory surpasses an allowable number; and transfer the pieces of the identification information sorted together with the change point intervals from the first layer storage to the second layer storage of the first memory.

5. The data processing device according to claim 3, wherein the circuitry is further configured to:

store, in unit storage of the first layer storage of the first memory, pieces of the identification information of the video data at consecutive addresses in units of a predetermined number of pieces of the identification information; and store, in an index storage of the first layer storage of the first memory, addresses of the pieces of the identification information in the unit storage of the first layer storage of the first memory in units of pieces of the identification information that are each associated with one of the change point intervals in the predetermined range.

6. The data processing device according to claim 3, wherein the circuitry is further configured to:

store, in a unit storage of the second memory, pieces of the identification information at consecutive addresses in units of a predetermined number of pieces of the identification information; and store, in an index storage of the second memory, addresses of the pieces of the identification information in the unit storage of the second memory.

7. The data processing device according to claim 2, wherein the second memory stores the change point intervals in a time-series order at consecutive addresses.

8. The data processing device according to claim 7, wherein circuitry is further configured to:

store, in unit storage of the second memory, the change point intervals in a time-series order at consecutive addresses; and store, in an index storage of the second memory, addresses of the change point intervals in the unit storage of the second storage unit.

9. The data processing device according to claim 2, wherein the circuitry is further configured to:

register identification information of video data in the first memory in association with each change point interval included in the video data; and register the change point intervals included in the video data in the second memory in a time-series order, the change point intervals being registered in association with the identification information of the video data.

10. A data processing method, comprising:

storing identification information for identification of video data based on a time where a predetermined feature occurs within the video data, the time being measured according to a time scale of the video data;

storing the predetermined feature included in the video data in association with the identification information for identification of the video data;

reading out the identification information stored in the identification information storing step based on a feature included in input video data;

reading out the predetermined feature stored in the feature storing step based on the identification information read out in the identification information reading step; and comparing input feature time information of the feature included in the input video data with predetermined feature time information of the predetermined feature;

determining that the input video data matches video data corresponding to the predetermined feature when the input feature time information matches the predetermined feature time information; and when the input feature time information does not match the predetermined feature time information, adding subsequent time information to a smaller one of the input feature time information and the predetermined feature time information to generate new time information, and comparing the new time information to a larger of the input feature time information and the predetermined feature time information to determine whether or not the input video data matches the video data corresponding to the predetermined feature.

11. A data processing device, comprising:

first storage means for storing identification information for identification of video data based on a time where a predetermined feature occurs in the video data, the time being measured according to a time scale of the video data;

second storage means for storing the predetermined feature included in the video data in association with the identification information for identification of the video data;

first reading means for reading out the identification information stored in the first storage means based on a feature included in input video data;

second reading means for reading out the predetermined feature stored in the second storage means based on the identification information read out by the first reading means; and checking means for comparing input feature time information of the feature included in the input video data with predetermined feature time information of the predetermined feature read out by the second reading means;

means for determining that the input video data matches video data corresponding to the predetermined feature read by the second reading means when the input feature time information matches the predetermined feature time information; and when the input feature time information does not match the predetermined feature time information, means for adding subsequent time information to a smaller one of the input feature time information and the predetermined feature time information to generate new time information, and comparing the new time information to a larger of the input feature time information and the predetermined feature time information to determine whether or not the input video data matches the video data corresponding to the predetermined feature.

12. The data processing device according to claim 11, further comprising:

color histogram extracting means for extracting a color histogram of each screen of the input video data;

histogram difference calculator means for calculating a difference between color histograms corresponding to successive screens of the input video data;

determining means for determining whether the difference calculated by the histogram difference calculator means identifies the identification information based on a threshold.

13. The data processing device according to claim 12, wherein the color histogram extracting means extracts a color histogram for each pixel in each of the screens of the input video data.

14. The data processing device according to claim 13, wherein the color histogram includes luminance and color difference information.

* * * * *